United States Patent
Underkoffler et al.

(10) Patent No.: US 10,529,302 B2
(45) Date of Patent: Jan. 7, 2020

(54) SPATIALLY MEDIATED AUGMENTATIONS OF AND INTERACTIONS AMONG DISTINCT DEVICES AND APPLICATIONS VIA EXTENDED PIXEL MANIFOLD

(71) Applicant: Oblong Industries, Inc., Los Angeles, CA (US)

(72) Inventors: John Stephen Underkoffler, Los Angeles, CA (US); Carlton J. Sparrell, Marblehead, MA (US); Brandon Lee Walter Harvey, Los Angeles, CA (US); Peter Joseph Hawkes, Los Angeles, CA (US)

(73) Assignee: Oblong Industries, Inc., Los Angeles, CA (US)

( * ) Notice: Subject to any disclaimer, the term of this patent is extended or adjusted under 35 U.S.C. 154(b) by 112 days.

(21) Appl. No.: 15/643,264

(22) Filed: Jul. 6, 2017

(65) Prior Publication Data

US 2018/0012567 A1  Jan. 11, 2018

Related U.S. Application Data

(60) Provisional application No. 62/359,559, filed on Jul. 7, 2016.

(51) Int. Cl.
  *G09G 5/14* (2006.01)
  *G09G 5/12* (2006.01)
  (Continued)

(52) U.S. Cl.
  CPC .............. *G09G 5/14* (2013.01); *G06F 3/011* (2013.01); *G06F 3/0346* (2013.01); *G06F 3/14* (2013.01);
  (Continued)

(58) Field of Classification Search
  CPC .... G09G 5/12; G09G 5/14; G09G 2340/0464; G06F 3/011; G06F 3/14; G06F 3/0346; G06F 3/1446; G06F 2203/04803
  See application file for complete search history.

(56) References Cited

U.S. PATENT DOCUMENTS

| 476,788 A | 6/1892 | Devine |
| 4,843,568 A | 6/1989 | Krueger et al. |

(Continued)

FOREIGN PATENT DOCUMENTS

| CN | 102422236 | 4/2012 |
| EP | 1883238 | 1/1990 |

(Continued)

OTHER PUBLICATIONS

Addison-Wesley: "Inside Macintosh—vol. I", vol. I Chapter 1-8, Jan. 1, 1985 (Jan. 1, 1985), pp. 1-58.

(Continued)

*Primary Examiner* — Kent W Chang
*Assistant Examiner* — Chayce R Bibbee
(74) *Attorney, Agent, or Firm* — Jeffrey Schox; Shant Tchakerian

(57) ABSTRACT

Systems and methods for display. Program instructions of a client application are accessed. The client application is an application of a client device that is located within a viewable region of a display device. Display output of a first display system application is generated by executing the accessed program instructions. A first absolute position of the client device is determined. A display area for the display output of the display system application is determined. A first pixel region of the display device is determined. The first display region corresponds to the determined display area and the first absolute position of the client device. The (Continued)

display output of the display system application is displayed by using the determined first pixel region.

19 Claims, 19 Drawing Sheets

(51) Int. Cl.
| | |
|---|---|
| G06F 3/0346 | (2013.01) |
| G06F 3/01 | (2006.01) |
| H04L 29/08 | (2006.01) |
| H04W 4/02 | (2018.01) |
| G06F 3/14 | (2006.01) |

(52) U.S. Cl.
CPC ............. *G09G 5/12* (2013.01); *H04L 67/141* (2013.01); *H04W 4/025* (2013.01); *G06F 3/1446* (2013.01); *G06F 2203/04803* (2013.01); *G09G 2320/10* (2013.01); *G09G 2340/0464* (2013.01); *G09G 2340/10* (2013.01); *G09G 2354/00* (2013.01); *G09G 2370/20* (2013.01)

(56) References Cited

U.S. PATENT DOCUMENTS

| | | | |
|---|---|---|---|
| 5,454,043 A | 9/1995 | Freeman | |
| 5,581,276 A | 12/1996 | Cipolla et al. | |
| 5,594,469 A | 1/1997 | Freeman et al. | |
| 5,651,107 A | 7/1997 | Frank et al. | |
| 5,982,352 A | 11/1999 | Pryor | |
| 6,002,808 A | 12/1999 | Freeman | |
| 6,043,805 A | 3/2000 | Hsieh | |
| 6,049,798 A | 4/2000 | Bishop et al. | |
| 6,072,494 A | 6/2000 | Nguyen | |
| 6,075,895 A | 6/2000 | Qiao et al. | |
| 6,191,773 B1 | 2/2001 | Maruno et al. | |
| 6,198,485 B1 | 3/2001 | Mack et al. | |
| 6,215,890 B1 | 4/2001 | Matsuo et al. | |
| 6,222,465 B1 | 4/2001 | Kumar et al. | |
| 6,256,033 B1 | 7/2001 | Nguyen | |
| 6,351,744 B1 | 2/2002 | Landresse | |
| 6,385,331 B2 | 5/2002 | Harakawa et al. | |
| 6,456,728 B1 | 9/2002 | Doi et al. | |
| 6,501,515 B1 | 12/2002 | Iwamura | |
| 6,515,669 B1 | 2/2003 | Mohri | |
| 6,703,999 B1 | 3/2004 | Iwanami et al. | |
| 6,807,583 B2 | 10/2004 | Hrischuk et al. | |
| 6,819,782 B1 | 11/2004 | Imagawa et al. | |
| 6,950,534 B2 | 9/2005 | Cohen et al. | |
| 7,034,807 B2 | 4/2006 | Maggioni | |
| 7,042,440 B2 | 5/2006 | Pryor et al. | |
| 7,050,606 B2 | 5/2006 | Paul et al. | |
| 7,058,204 B2 | 6/2006 | Hildreth et al. | |
| 7,109,970 B1 | 9/2006 | Miller | |
| 7,129,927 B2 | 10/2006 | Mattsson | |
| 7,145,551 B1 | 12/2006 | Bathiche et al. | |
| 7,159,194 B2 | 1/2007 | Wong et al. | |
| 7,164,117 B2 | 1/2007 | Breed et al. | |
| 7,170,492 B2 | 1/2007 | Bell | |
| 7,227,526 B2 | 6/2007 | Hildreth et al. | |
| 7,229,017 B2 | 6/2007 | Richley et al. | |
| 7,259,747 B2 | 8/2007 | Bell | |
| 7,340,077 B2 | 3/2008 | Gokturk et al. | |
| 7,348,963 B2 | 3/2008 | Bell | |
| 7,366,368 B2 | 4/2008 | Morrow et al. | |
| 7,372,977 B2 | 5/2008 | Fujimura et al. | |
| 7,379,563 B2 | 5/2008 | Shamaie | |
| 7,379,566 B2 | 5/2008 | Hildreth | |
| 7,379,613 B2 | 5/2008 | Dowski, Jr. et al. | |
| 7,389,591 B2 | 6/2008 | Jaiswal et al. | |
| 7,421,093 B2 | 9/2008 | Hildreth et al. | |
| 7,428,542 B1 | 9/2008 | Fink et al. | |
| 7,428,736 B2 | 9/2008 | Dodge et al. | |
| 7,430,312 B2 | 9/2008 | Gu | |
| 7,436,595 B2 | 10/2008 | Cathey, Jr. et al. | |
| 7,466,308 B2 | 12/2008 | Dehlin | |
| 7,519,223 B2 | 4/2009 | Dehlin et al. | |
| 7,555,142 B2 | 6/2009 | Hildreth et al. | |
| 7,555,613 B2 | 6/2009 | Ma | |
| 7,559,053 B2 | 7/2009 | Krassovsky et al. | |
| 7,570,805 B2 | 8/2009 | Gu | |
| 7,574,020 B2 | 8/2009 | Shamaie | |
| 7,576,727 B2 | 8/2009 | Bell | |
| 7,598,942 B2 | 10/2009 | Underkoffler et al. | |
| 7,627,834 B2 | 12/2009 | Rimas-Ribikauskas et al. | |
| 7,665,041 B2 | 2/2010 | Wilson et al. | |
| 7,685,083 B2 | 3/2010 | Fairweather | |
| 7,692,131 B2 | 4/2010 | Fein et al. | |
| 7,725,547 B2 | 5/2010 | Albertson et al. | |
| 7,822,267 B2 | 10/2010 | Gu | |
| 7,827,698 B2 | 11/2010 | Jaiswal et al. | |
| 7,834,846 B1 | 11/2010 | Bell | |
| 7,848,542 B2 | 12/2010 | Hildreth | |
| 7,850,526 B2 | 12/2010 | Zalewski et al. | |
| 7,854,655 B2 | 12/2010 | Mao et al. | |
| 7,898,522 B2 | 3/2011 | Hildreth et al. | |
| 7,949,157 B2 | 5/2011 | Afzulpurkar et al. | |
| 7,966,353 B2 | 6/2011 | Wilson | |
| 7,979,850 B2 | 7/2011 | Ivanov et al. | |
| 7,984,452 B2 | 7/2011 | Chakravarty et al. | |
| 7,991,920 B2 | 8/2011 | Back et al. | |
| 8,059,089 B2 | 11/2011 | Daniel | |
| 8,094,873 B2 | 1/2012 | Kelusky et al. | |
| 8,116,518 B2 | 2/2012 | Shamaie et al. | |
| 8,144,148 B2 | 3/2012 | El Dokor et al. | |
| 8,212,550 B2 | 7/2012 | Katsurahira et al. | |
| 8,254,543 B2 | 8/2012 | Sasaki et al. | |
| 8,259,996 B2 | 9/2012 | Shamaie | |
| 8,269,817 B2 | 9/2012 | Kumar et al. | |
| 8,274,535 B2 | 9/2012 | Hildreth et al. | |
| 8,280,732 B2 | 10/2012 | Richter et al. | |
| 8,300,042 B2 | 10/2012 | Bell | |
| 8,325,214 B2 | 12/2012 | Hildreth | |
| 8,341,635 B2 | 12/2012 | Arimilli et al. | |
| 8,355,529 B2 | 1/2013 | Wu et al. | |
| 8,363,098 B2 | 1/2013 | Rosener et al. | |
| 8,370,383 B2 | 2/2013 | Kramer et al. | |
| 8,407,725 B2 | 3/2013 | Kramer et al. | |
| 8,472,665 B2 | 6/2013 | Hildreth | |
| 8,531,396 B2 | 9/2013 | Underkoffler et al. | |
| 8,537,111 B2 | 9/2013 | Underkoffler et al. | |
| 8,537,112 B2 | 9/2013 | Underkoffler et al. | |
| 8,559,676 B2 | 10/2013 | Hildreth | |
| 8,565,535 B2 | 10/2013 | Shamaie | |
| 8,625,849 B2 | 1/2014 | Hildreth et al. | |
| 8,659,548 B2 | 2/2014 | Hildreth | |
| 8,666,115 B2 | 3/2014 | Perski et al. | |
| 8,669,939 B2 | 3/2014 | Underkoffler et al. | |
| 8,681,098 B2 | 3/2014 | Underkoffler et al. | |
| 8,704,767 B2 | 4/2014 | Dodge et al. | |
| 8,723,795 B2 | 5/2014 | Underkoffler et al. | |
| 8,726,194 B2 | 5/2014 | Hildreth | |
| 8,745,541 B2 | 6/2014 | Wilson et al. | |
| 8,769,127 B2 | 7/2014 | Selimis et al. | |
| 8,830,168 B2 | 9/2014 | Underkoffler et al. | |
| 8,856,691 B2 | 10/2014 | Geisner et al. | |
| 8,866,740 B2 | 10/2014 | Underkoffler et al. | |
| 9,063,801 B2 | 6/2015 | Kramer et al. | |
| 9,075,441 B2 | 7/2015 | St Hilaire et al. | |
| 9,213,890 B2 | 12/2015 | Huang et al. | |
| 9,261,979 B2 | 2/2016 | Shamaie et al. | |
| 9,317,128 B2 | 4/2016 | Minnen et al. | |
| 9,465,457 B2 | 10/2016 | Thompson et al. | |
| 9,684,380 B2 | 6/2017 | Kramer et al. | |
| 9,740,293 B2 | 8/2017 | Kramer et al. | |
| 9,880,635 B2 | 1/2018 | Kramer et al. | |
| 2002/0065950 A1 | 5/2002 | Katz et al. | |
| 2002/0085030 A1 | 7/2002 | Ghani | |
| 2002/0184401 A1 | 12/2002 | Kadel et al. | |
| 2002/0186200 A1 | 12/2002 | Green | |
| 2003/0048280 A1 | 3/2003 | Russell | |
| 2004/0125076 A1 | 7/2004 | Green | |

(56) References Cited

U.S. PATENT DOCUMENTS

| | | | |
|---|---|---|---|
| 2005/0196785 A1 | 9/2005 | Quake et al. | |
| 2005/0212753 A1 | 9/2005 | Marvit et al. | |
| 2006/0269145 A1 | 11/2006 | Roberts | |
| 2007/0288467 A1 | 12/2007 | Strassner et al. | |
| 2008/0208517 A1 | 8/2008 | Shamaie | |
| 2008/0222660 A1 | 9/2008 | Tavi et al. | |
| 2010/0060568 A1 | 3/2010 | Fisher et al. | |
| 2010/0315439 A1 | 12/2010 | Huang et al. | |
| 2012/0054671 A1* | 3/2012 | Thompson | G06F 3/038 715/784 |
| 2012/0229383 A1 | 9/2012 | Hamilton et al. | |
| 2012/0239396 A1 | 9/2012 | Johnston et al. | |
| 2014/0325371 A1* | 10/2014 | Wilson | G06F 3/0487 715/739 |
| 2014/0355819 A1* | 12/2014 | Naruse | G06F 3/1423 382/103 |
| 2015/0077326 A1 | 3/2015 | Kramer et al. | |
| 2016/0328121 A1* | 11/2016 | Moran | G06F 3/04842 |

FOREIGN PATENT DOCUMENTS

| | | |
|---|---|---|
| EP | 0899651 | 2/2000 |
| WO | 009972 | 10/1989 |
| WO | 035633 | 7/1999 |
| WO | 134452 | 11/2008 |
| WO | 030822 | 3/2010 |

OTHER PUBLICATIONS

Bacon, J.; et al., "Using Events to Build Distributed Applications", Second International Workshop on Services in Distributed and Networked Environments, 1995, pp. 148-155.

Bretzner, Lars et al. "A Prototype System for Computer Vision Based Human Computer Interaction", Technical report CVA251, ISRN KTH NA/P—01/09—SE. Department of Numerical Analysis and Computer Science, KTH (Royal Institute of Technology), S-100 44 Stockh.

Carey, Michael J.; et al., "The Architecture of the Exodus Extensible Dbms", Proceeding OODS, 1986, pp. 52-65.

Jiang,H,; et al., "Demis: A Dynamic Event Model for Interactive Systems", Proceedings of the Acm Symposium on Virtual Reality Software and Technology, 2002, pp. 97-104.

Johanson, B.; et al., "The Event Heap: A Coordination Infrastructure for Interactive Workspaces", Proceedings Fourth IEEE Workshop on Mobile Computing Systems and Applications, 2002, pp. 83-93.

Johanson, B.; et al., "The Interactive Workspaces Project: Experiences with Ubiquitous Computing Rooms", IEEE Pervasive Computing, 2002, vol. 1 (2), pp. 67-74.

Mansouri-Samani, M.; et al., "A Configurable Event Service for Distributed Systems", Third International conference on Annapolis Configurable Distributed Systems, 1996, pp. 210-217.

McCuskey, William A., "On Automatic Design of Data Organization", American Federation of Information Processing Societies, 1970, pp. 187-199.

Rubine, D., "Specifying Gestures by Example", Computer Graphics, 1991, vol. 25 (4), pp. 329-337.

Velipasalar S.; et al., "Specifying, Interpreting and Detecting High-level, Spatio-Temporal Composite Events in Single and Multi-Camera Systems", Conference on Computer Vision and Pattern Recognition Workshop, 2006, pp. 110-110.

Hyakutake Akito: et al. 3-D Interaction with a Large Wall Display using Transparent Markers, Graduate School of Information Systems, University of Electro-Communications, 1-5-1 Chofugaoka Chofu Tokyo 182-8585, Japan, pp. 97-100.

* cited by examiner

SPATIALLY MEDIATED AUGMENTATIONS OF AND INTERACTIONS AMONG DISTINCT DEVICES AND APPLICATIONS VIA EXTENDED PIXEL MANIFOLD

CROSS-REFERENCE TO RELATED APPLICATIONS

This application claims the benefit of U.S. Provisional Application Ser. No. 62/359,559, filed on 7 Jul. 2016, which is incorporated in its entirety by this reference

TECHNICAL FIELD

This disclosure herein relates generally to display systems, and more specifically to new and useful systems and methods for controlling display systems by using computing devices.

BACKGROUND

Typical display systems involve a computing device providing display output data to a display device that is coupled to the computing device. There is a need in the computing field to create new and useful systems and methods for controlling display systems by using computing devices. The disclosure herein provides such new and useful systems and methods.

DESCRIPTION OF EMBODIMENTS

The following description of embodiments is not intended to limit the invention to these embodiments, but rather to enable any person skilled in the art to make and use the embodiments.

1. OVERVIEW

Figure 1:
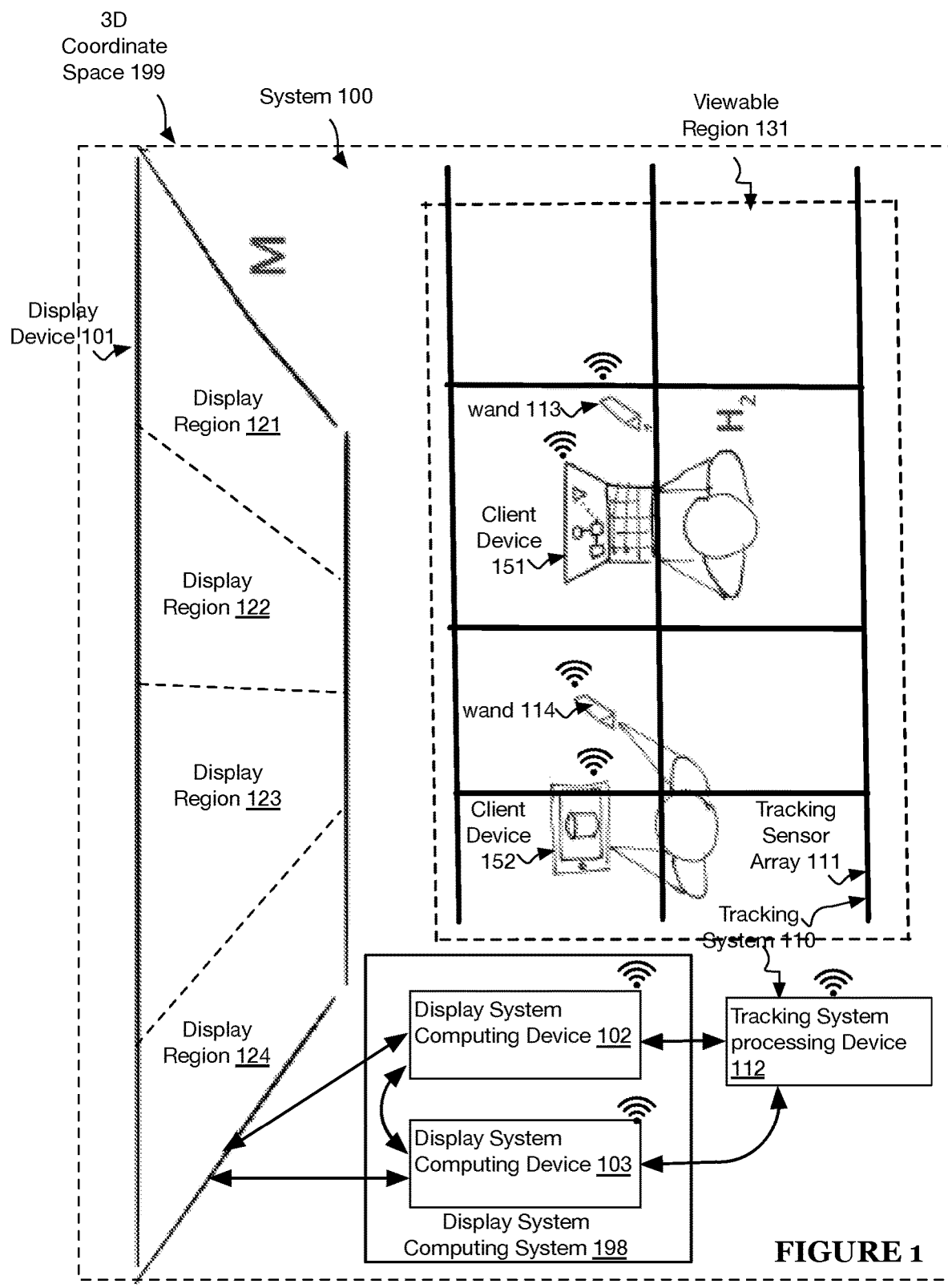
FIG. 1 is a schematic representation of a multi-region display system in accordance with embodiments.

Some embodiments herein include systems and methods that enable at least one person bearing a hardware client device (e.g., 151, 152) (sometimes referred to herein as "computational device", "client computing device", "spatial application client device") to interact with a display region (e.g., 121-124) of a multi-region display device (e.g., 101 of FIG. 1). In some embodiments, each display region includes a subset of physical pixels of the multi-region display device. In some embodiments, the multi-region display device is included in a multi-region display system (e.g., 100 of FIG. 1) that also includes at least one display system computing device (e.g., 102, 103) (sometimes referred to herein as "spatial application display system computing device"). A client device's proximity to the multi-region display device allows applications running on the client device (e.g., the spatial client application A 1294 of FIG. 12) to notionally extend across the gap between the client device and the multi-region display device and begin executing additionally on at least one display system computing device of the multi-region display system (e.g., as the spatial display system application A 1194 of FIG. 11). New UI (User Interface) elements allow the participants to control both the device-local version of the application (e.g., 1294) (the version running on a client device) and multi-region resident versions of the applications (e.g., 1194) (the version running on the multi-region display system), which run as synchronized but distinct and independent programs. The multi-region display system further allows each application to transmit metadata and elements of a conformed API (Application Program Interface) in such a way that multiple such applications may begin interoperating, exchanging data and behaviors, and offering to the human participants (operating the respective client devices) collaborative control. Some participants may also use separate spatial control devices (e.g., 113, 114 of FIG. 1) to interact with the programs running on the multi-region display device (e.g., 1194) and on the individual client devices (e.g., 1294). In some embodiments, the multi-region display device may also exist as a collection of spatially disjoint and possibly distant display devices such that an elaborated version of the UI above allows participants at a respective display device (or collection of display devices) to perceive the participants, client devices, and programs present at each of the other display devices of the multi-region display system, and to continue to interact with them as if all were in immediate proximity.

2. SYSTEMS

FIG. 1 is a schematic representation of a multi-region display system 100 in accordance with embodiments.

In some embodiments, the multi-region display system 100 includes a multi-region display device 101, and at least one display system computing device 102, 103. In some embodiments, the display system 100 includes a tracking system 110. In some embodiments, the tracking system 110 includes a tracking sensor array 111, and a tracking system processing device 112. In some embodiments, the tracking system 110 includes at least one tracking wand 113, 114. In some embodiments, the tracking system 110 is constructed to determine an absolute position of each tracking wand 113, 114. In some embodiments, the tracking system 110 is constructed to determine an absolute position of each client device (e.g., 151, 152) located within a tracking region relative to a location of the display system 100. In some embodiments, an absolute position of a tracking wand (e.g., 113, 114) is indicated by three-dimensional coordinates in a three-dimensional coordinate space. In some embodiments, an absolute position of a client device is indicated by three-dimensional coordinates in a three-dimensional coordinate space. In some embodiments, the three-dimensional coordinate space is a coordinate space relative to the multi-region display device lot. The multi-region display device lot includes a plurality of display regions (e.g., 121-124). At least one display system computing device 102 of the display system 100 controls the display regions (e.g., 121-124). In some embodiments, a single display system computing device 102 of the display system 100 controls the display regions. In some embodiments, a plurality of display system computing devices of the display system 100 controls the display regions. In some embodiments, each display region is a display device and the multi-region display device is composed of the individual display devices (e.g., display regions). In some embodiments, each display region is an independently addressable region of physical pixels of a single display device. In some implementations, the multi-region display device is arranged as a pixel wall.

Figure 12:
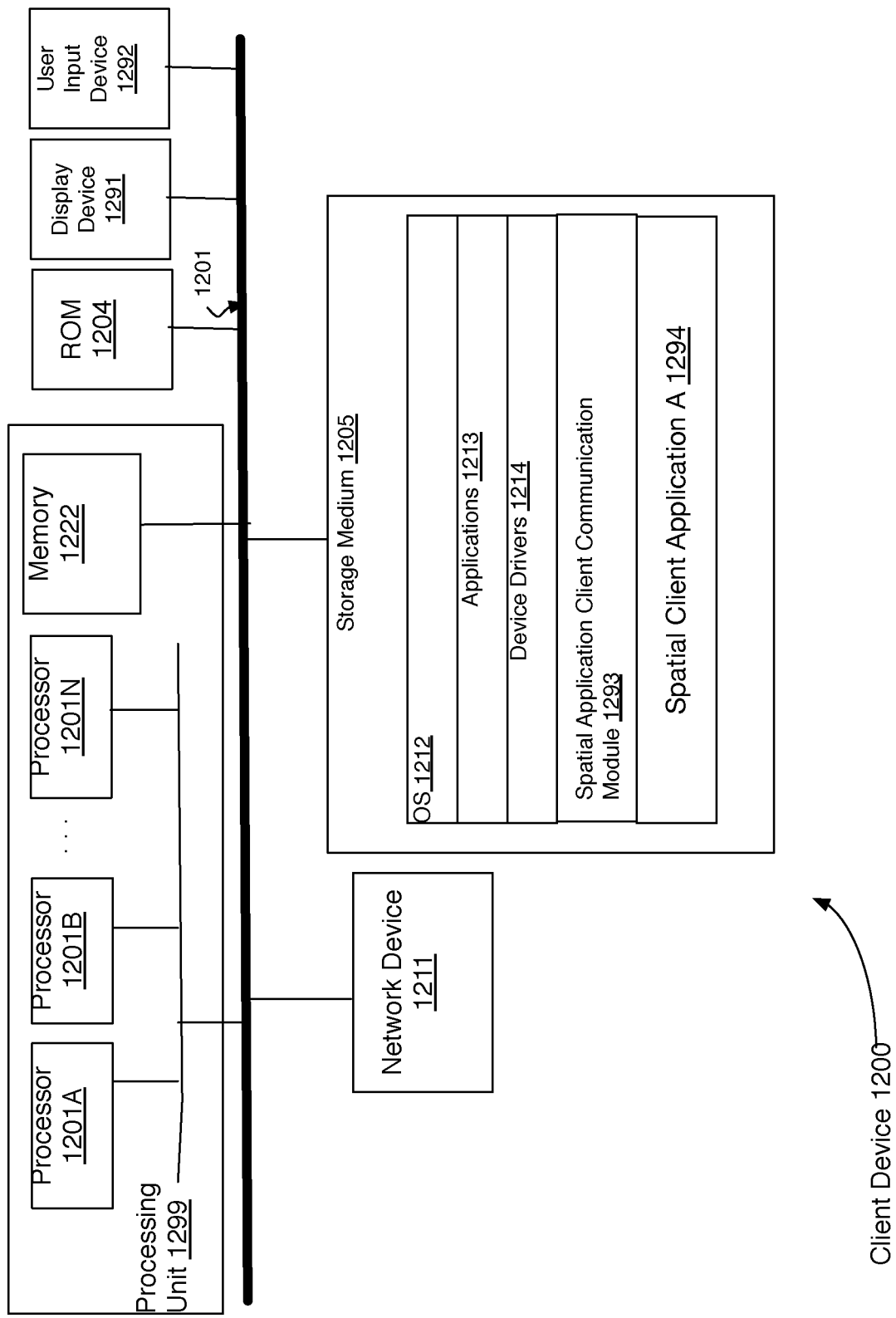
FIG. 12 is an architecture diagram of a client computing device, in accordance with embodiments.

In some embodiments, each client device 151, 152 includes at least one of a mobile device, a laptop, tablet, phone, a wearable device, a PDA, a smart device, and any other suitable type of client computing device that is constructed to execute machine-executable program instructions of a client application (e.g., 1294 of FIG. 12). In some embodiments, each client device 151, 152 is similar to the client device 1200 of FIG. 12.

In some embodiments, each client device includes a spatial application client communication module (e.g., 1293 of FIG. 12). In some embodiments, the machine-executable program instructions of the spatial application client communication module are included in machine-executable program instructions of an operating system (e.g., 1212 of FIG. 1) of the client device. In some embodiments, the machine-executable program instructions of the spatial application client communication module are included machine-executable program instructions of an application (e.g., 1294) of the client device. In some embodiments, the machine-executable program instructions of the spatial application client communication module are included machine-executable program instructions of a virtual machine of the client device. In some embodiments, the machine-executable program instructions of the spatial application client communication module are included machine-executable program instructions of a web browser of the client device.

Figure 11:
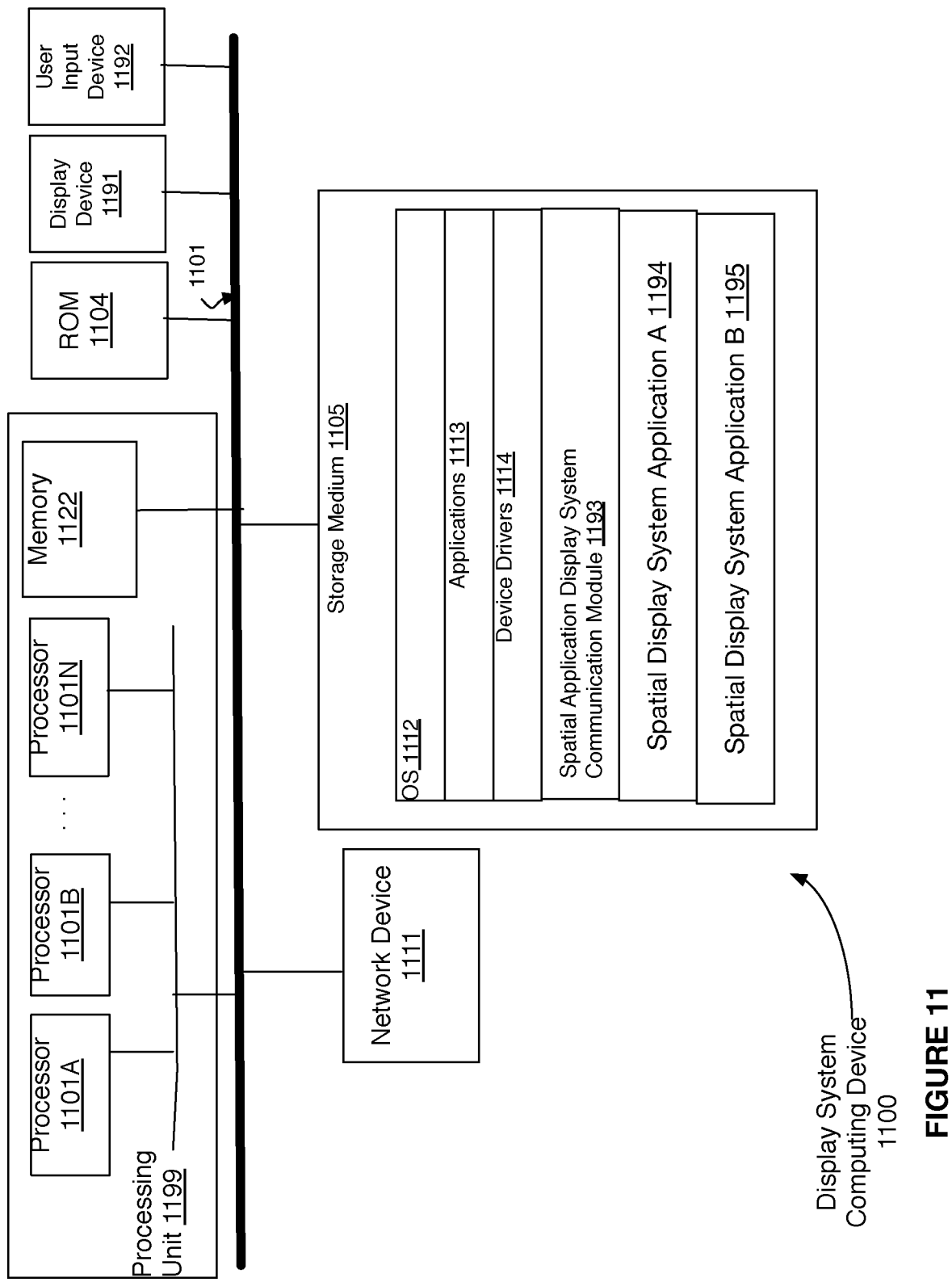
FIG. 11 is an architecture diagram of a display system computing device of the multi-region display system, in accordance with embodiments.

In some embodiments, each display system computing device (e.g., 102, 103) is similar to the display system computing device 1100 of FIG. 11. In some embodiments, each display system computing device (e.g., 102, 103) includes a spatial application display system communication module (e.g., 1193 of FIG. 1).

In some embodiments, each spatial application client communication module is constructed to provide machine-executable program instructions and program data of at least a first client application (e.g., 1294) of the client device to at least one display system computing device (e.g., 102, 103) of the system 100. In some embodiments, each spatial application client communication module (e.g., 1293) is constructed to provide user input data of at least the first client application (e.g., 1294) to at least one display system computing device (e.g., 102, 103) of the system 100. In some embodiments, each spatial application client communication module (e.g., 1293) is constructed to provide an absolute position of the client device (as indicated by three-dimensional coordinates in a three-dimensional coordinate space) to at least one display system computing device of the system 100. In some embodiments, each spatial application client communication module (e.g., 1293) is constructed to provide display data of the first client application to at least one display system computing device of the system 100.

In some embodiments, each spatial application display system communication module (e.g., 1193) is constructed to provide machine-executable program instructions of at least a first remote application (e.g., 1194) (corresponding to the first client application) of a display system computing device (of the system 100) to the client device of the first client application (e.g., 1294).

In some embodiments, each spatial application display system communication module (e.g., 1193) is constructed to provide program data of at least a first remote application (e.g., 1194) (corresponding to the first client application) of a display system computing device (of the system 100) to the client device of the first client application (e.g., 1294).

In some embodiments, each spatial application display system communication module (e.g., 1193) is constructed to provide user input data of at least a first remote application (e.g., 1194) (corresponding to the first client application) of a display system computing device (of the system 100) to the client device of the first client application (e.g., 1294).

In some embodiments, each spatial application display system communication module (e.g., 1193) is constructed to provide an absolute position of each display region (e.g., 121-124) of the computing device (e.g., 102, 103) of the spatial application display system communication module (e.g., 1193) to at least one client device (e.g., 151, 152).

In some embodiments, each spatial application display system communication module (e.g., 1193) is constructed to provide display data of the first remote application (e.g., 1194) to the first client device (e.g., 151, 152).

In some embodiments, the first client application (e.g., 1294) is a spatial client application. In some embodiments, the spatial client application is a g-speak application as described in US-2015-0077326, the contents of which is incorporated in its entirety by this reference.

In some implementations, each spatial application client communication module (e.g., 1293) includes a g-speak module provided by Oblong Industries. In some implementations, each spatial application client communication module is constructed to provide g-speak functionality as described in US-2015-0077326, the contents of which is incorporated in its entirety by this reference.

In some implementations, each spatial application display system communication module (e.g., 1193) includes a g-speak module provided by Oblong Industries. In some implementations, each spatial application display system communication module is constructed to provide g-speak functionality as described in US-2015-007326, the contents of which is incorporated in its entirety by this reference.

In some implementations, the spatial application client communication module (e.g., 1293) is constructed to provide communication via a spatial application network, and each spatial application display system communication module (e.g., 1193) is constructed to provide communication via the spatial application network. In some embodiments, the spatial application network is a g-speak network in accordance with the g-speak communication protocol provided by Oblong Industries.

In some embodiments each display system computing device (e.g., 102, 103) is a hardware computing device. In some embodiments, each display system computing device is a virtual computing device provided by at least one hardware computing device. In some embodiments, the system 100 includes at least one virtual display system computing device and at least one hardware display system computing device.

In some embodiments, each display system computing device controls one display region. In some embodiments, each display system computing device controls a plurality of display regions.

In some embodiments, the tracking system 110 is constructed to determine an absolute position of a client device (e.g., 151, 152) located within a predetermined distance from the multi-region display device 101. In some embodiments, the predetermined distance is a distance within which a human can view the multi-region display device lot. In some embodiments, the tracking system 110 is constructed to determine an absolute position of a client device located within a viewable region (e.g., 131) of the multi-region display device lot. In some embodiments, the viewable region is predetermined. In some embodiments, the viewable region is a region within which a human can view the multi-region display device lot. In some embodiments, the tracking system 110 is constructed to determine the absolute position in real time. In some embodiments, the tracking system 110 is constructed to determine the absolute position by performing spatial tracking by using at least one of a tracking sensor array (e.g., 111), and a tracking system processing device (e.g., 112), a tracking wand (e.g., 113, 114), an optical sensor, a camera, and a sensor of the client device (e.g., accelerometer, inertial measurement unit (IMU), and the like).

In some embodiments, at least one display system computing device of the multi-region display system 100 is constructed to identify each client device that is located within the viewable region and that is constructed for communication with the multi-region display system 100. In some embodiments, the at least one display system computing device of the multi-region display system 100 is constructed to identify each client device that is located within the viewable region and that is constructed for communication with the multi-region display system 100 by using the tracking system and the spatial application display system communication module.

In some embodiments the at least one display system computing device (e.g., 102, 103) is communicatively coupled to a first spatial application network (e.g., via at least one of a wired and a wireless communication interface), the display system computing device communicates with other spatial application devices (e.g., client devices, other display system computing devices) via the first spatial application network by using the spatial application display system communication module; responsive to a spatial application client device (e.g., 151, 152) communicatively coupling to the first spatial application network, the at least one display system computing device identifies the spatial application client device by using the spatial application display system communication module (e.g., 1193), and determines an absolute position of the spatial application client device by using at least one of the spatial application display system communication module and the tracking system 110. In some embodiments, the at least one display system computing device receives the absolute position of the spatial application client device from the client device via the first spatial application network by using the spatial application display system communication module. In some embodiments, the at least one display system computing device receives the absolute position of the spatial application client device from the tracking system 110. In some embodiments, the at least one display system computing device receives the absolute position of the spatial application client device from the tracking system 110 via the first spatial application network by using the spatial application display system communication module.

2.1 Multi-Location Display

In some embodiments, the multi-region display device 101 is a multi-location multi-region display device that includes a multi-region sub-display device in different locations. In some embodiments, each sub-display device is separated from each other by an arbitrary distance. In some embodiments, each sub-display device is located in a different geographic region. In some embodiments, each sub-display device includes at least one display region. In some embodiments, each sub-display device has a respective viewable sub-region. In some embodiments, a human located in a first viewable sub-region can view at least one display region of a first sub-display device corresponding to the first viewable sub-region, but cannot see display regions of a second sub-display device corresponding to a second viewable sub-region.

In some embodiments, the display device 101 includes a plurality of sub-display devices, separated from each other by an arbitrary distance such that a human located in a first viewable sub-region of a first sub-display device cannot view a sub-display device of a different, second viewable region. In some embodiments, client display devices (and corresponding users) located within a first viewable region of a first sub-display device are disjoint from client display devices (and corresponding users) located within a different, second viewable region of a second sub-display device. In some embodiments, then at each sub-display device, extended interface elements depict the existence and real-time state of client devices (and associated users and client applications) at the other sub-display devices. In this manner, client devices of a first viewable region (e.g., 131) indicate to the respective users the presence of and interactional opportunity with respect to all other client devices (and respective users and client applications) irrespective of proximity or remoteness, substantially as if all client devices were co-present at a singular multi-region display device.

3. METHOD FOR PROGRAMMATIC DEVICE CONNECTIVITY

Figure 2A:
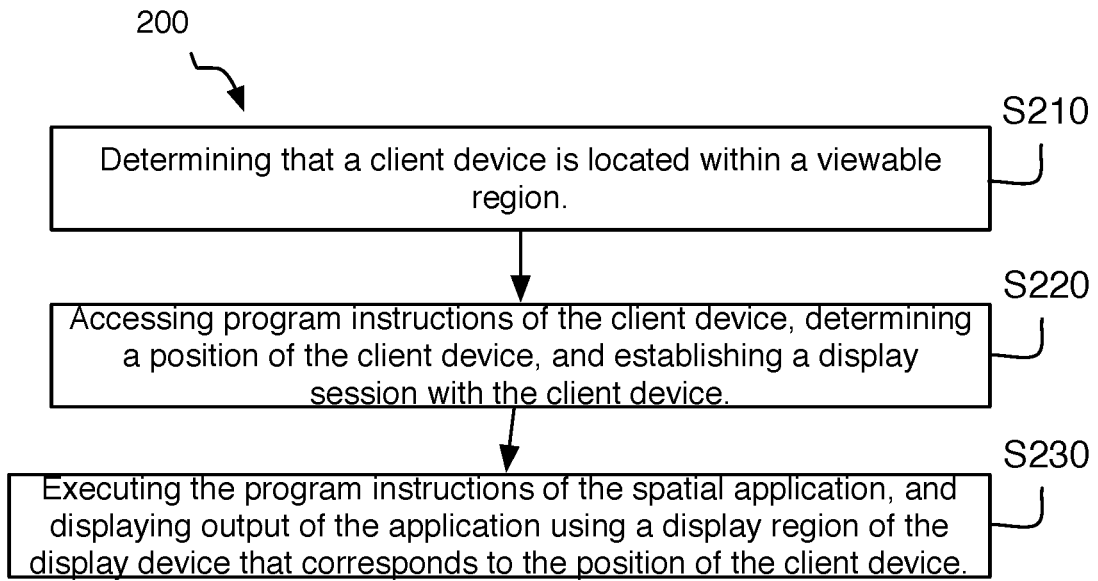
FIGS. 2A-B are flowchart representations of methods in accordance with embodiments.
Figure 2B:
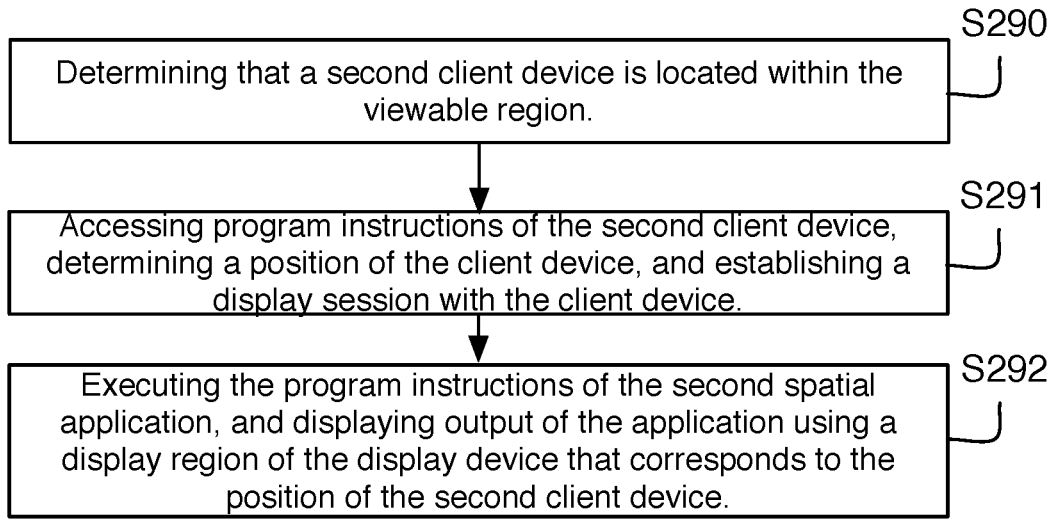

FIG. 2 is a flowchart representation of a method 200 in accordance with embodiments. In some embodiments, the method 200 is performed by a multi-region display system (e.g., 100) that includes a multi-region display device (e.g., 101), and at least one display system computing device (e.g., 102, 103). In some embodiments, each display system computing device includes a spatial application display system communication module (e.g., 1193). In some embodiments, each display system computing device is communicatively coupled to a first spatial application network via the respective spatial application display system communication module. In some embodiments, the multi-region display system includes a plurality of display system computing devices, and each display system computing device is communicatively coupled to the other display system computing devices via the first spatial application network. In some embodiments, the display system (e.g., 100) includes a tracking system (e.g., 110). In some embodiments, the tracking system is communicatively coupled to each display system computing device of the multi-region display system via the first spatial application network.

In some embodiments, the multi-region display device 101 includes a plurality of display regions (e.g., 121-124).

In some embodiments, the method 200 includes: at least a first display system computing device (e.g., 102, 103) of the multi-region display system (e.g., 100) determining that a first client device (e.g., 151, 152) having a first spatial application client device communication module (e.g., 1293) is located within a first viewable region (e.g., 131) of the multi-region display device (e.g., 101) (process S210); responsive to the first display system computing device determining that a first client device is located within the first viewable region, the first display system computing device: accessing first machine-executable program instructions (e.g., retrieving the instructions from a storage device of the multi-region display system, receiving the instructions from the first client device, requesting the instructions from the first client device) corresponding to a first spatial client application (e.g., 1294) of the first client device via the spatial application network by using a first spatial application display system communication module of the first display system computing device, determining a first position of the first client device within the first viewable region, and establishing a first spatial application display session with the first client device via the first spatial application network (process S220); responsive to establishing the first spatial application display session with the first client device, the multi-region display system executing the first machine-executable program instructions as a first spatial display system application (e.g., 1194) that corresponds to the first spatial client application (e.g., 1294) of the first client device and displaying output of the first spatial display system application by using at least a first display region (e.g., 121-124) of the multi-region display device that corresponds to the determined first position of the first client device (process S230).

In some embodiments, the first position is an absolute position. In some embodiments, the first position is an absolute position that is indicated by three-dimensional coordinates in a three-dimensional coordinate space (e.g., 199 of FIG. 1). In some embodiments, the three-dimensional coordinate space is a coordinate space relative to the multi-region display device. In some embodiments, the three-dimensional coordinate space is a coordinate space of a room (e.g., 199). In some embodiments, the three-dimensional coordinate space is a coordinate space of a viewable region (e.g., 131).

In some embodiments, the method 200 includes: responsive to the multi-region display system determining (e.g., by using a display system computing device) changed spatial application program data of the first spatial display system application (e.g., 1194), the multi-region display system providing the changed spatial application program data to the first spatial client application (e.g., 1294) of the first client device via the first spatial application network. In some embodiments, spatial application program data includes event data. In some embodiments, spatial application program data includes meta-data.

In some embodiments, the method 200 includes: responsive to the multi-region display system receiving (e.g., by using a display system computing device) changed spatial application program data of the first spatial client application (e.g., 1294) via the first spatial application network, the multi-region display system updating the first spatial display system application (e.g., 1194) by using the received changed spatial application program data.

In some embodiments, the method 200 includes: responsive to the multi-region display system receiving (e.g., by using a display system computing device) user input for the first spatial display system application (e.g., 1194) via a user interface device (e.g., 113, 114) communicatively coupled to the multi-region display system, the multi-region display system providing the received user input to the first spatial client application (e.g., 1294) of the first client device via the first spatial application network.

In some embodiments, the method 200 includes: responsive to the multi-region display system receiving (e.g., by using a display system computing device) user input (e.g., via the user input device 1292 of FIG. 12) for the first spatial client application (e.g., 1294) via the first spatial application network, the multi-region display system updating the first spatial display system application (e.g., 1194) by using the received user input.

In some embodiments, the method 200 includes: responsive to the multi-region display system determining (e.g., by using a display system computing device) a change in position of the first client device from the first position to a second position within the first viewable region (e.g. 131), the multi-region display system displaying output of the first spatial display system application (e.g., 1194) by using a second display region of the multi-region display device that corresponds to the determined second position of the first client device. In some embodiments, determining a change in position of the first client device from the first position to a second position within the first viewable region includes determining that the change in position exceeds a threshold value.

In some embodiments, the first viewable region (e.g., 131) is a region within which a human can view the multi-region display device.

In some embodiments, the process S220 includes responsive to the first display system computing device determining that a first client device is located within the first viewable region, the first display system computing device accessing first program data (e.g., retrieving the program data from a storage device of the multi-region display system, receiving the program data from the first client device, requesting the instructions from the first client device) corresponding to the first spatial client application (e.g., 1294) of the first client device via the spatial application network by using the first spatial application display system communication module (e.g., 1193) of the first display system computing device.

In some embodiments, the process S230 includes using at least the first display system computing device to execute the first machine-executable program instructions (e.g., of the application 1194). In some embodiments, the process S230 includes using at least a second display system computing device of the multi-region display system to execute the first machine-executable program instructions (e.g., of the application 1194). In some embodiments, the process S230 includes using a plurality of display system computing devices of the multi-region display system to execute the first machine-executable program instructions (e.g., of the application 1194).

In some embodiments, the first spatial client application (e.g., 1294) is a spatially-enabled cloud-based application. In some embodiments, the first client application (e.g., 1294) is a web application that is communicatively coupled to the first spatial application client device communication module (e.g., 1293). In some embodiments, the first client application (e.g., 1294) is a web application that is executed by a spatial application virtual machine that includes the first spatial application client device communication module (e.g., 1293).

In some embodiments, the process S220 includes, the first display system computing device providing the first client device with a notification indicating that the first client device can communicatively couple to the multi-region display system 100, and responsive to a display session response provided by the first client device, the first display system computing device establishing a display session with the first client device via the spatial application network. In some embodiments, the first display system computing device provides the notification via the spatial application network by using the spatial application display system communication module (e.g., 1193). In some embodiments, the first client device provides the display session response via the spatial application network by using the spatial application client device communication module (e.g., 1293).

In some embodiments, the system 100 is constructed to receive a display session request provided by a first client device, and in some embodiments, the process S220 includes responsive to the display session request, the first display system computing device establishing a display session with the first client device via the spatial application network. In some embodiments, the first client device provides the display session request via the spatial application network by using the spatial application client device communication module (e.g., 1293) and the first display system computing device receives the display session request via the spatial application network by using the spatial application display system device communication module (e.g., 1193).

In some embodiments, the process S220 includes responsive to the display session request, the first display system computing device receiving the first machine-executable program instructions. In some embodiments, the display session request includes the first machine-executable program instructions. In some embodiments, the display session request includes information used by the first display system computing device to access the first machine-executable program instructions.

In some embodiments, the process S220 includes responsive to the display session response, the first display system computing device receiving the first machine-executable program instructions. In some embodiments, the display session response includes the first machine-executable program instructions. In some embodiments, the display session response includes information used by the first display system computing device to access the first machine-executable program instructions.

In some embodiments, displaying output of the first spatial display system application (e.g., 1194) by using the first display region (e.g., one of 121-124) includes the first display system computing device selecting the first display region based on the first position of the first client device. In some embodiments, the first display system computing device selects the first display region based on a distance between a location of the first display region (e.g., 121) and the first position of the first client device (e.g., 151). In some embodiments, the first display system computing device selects the first display region most proximate to the first client device based on a location of the first display region and the first position of the first client device.

Displaying Spatial Application Output

In some embodiments, displaying output of the first spatial display system application (e.g., 1194) by using at least a first display region of the multi-region display device that corresponds to the determined first position of the first client device (process S230) includes using a plurality of display regions of the multi-region display device that correspond to the determined first position of the first client device (process S230). In some embodiments, the multi-region display system determines that output of the first spatial display system application (e.g., 1194) spans plural display regions (e.g., 121-124), and the multi-region display system uses a plurality of display regions of the multi-region display device that correspond to the determined first position of the first client device to display the output of the first spatial display system application (e.g., 1194). In some embodiments a display area of the output of the first spatial display system application (e.g., 1194) is different than a display area of the output of the first spatial client application (e.g., 1294). In some embodiments a resolution of the output of the first spatial display system application (e.g., 1194) is different than a resolution of the output of the first spatial client application (e.g., 1294).

In some embodiments a change in display area of the output of the first spatial display system application (e.g., 1194) does not change a display area of the output (e.g., by the display device 1291 of FIG. 12) of the first spatial client application (e.g., 1193). In some embodiments a change in resolution of the output of the first spatial display system application (e.g., 1194) does not change a resolution of the output of the first spatial client application (e.g., 1294).

In some embodiments a change in display area of the output of the first spatial display system application (e.g., 1194) does change a display area of the output of the first spatial client application (e.g., 1294). In some embodiments a change in resolution of the output of the first spatial display system application (e.g., 1194) does change a resolution of the output of the first spatial client application (e.g., 1294).

In some embodiments a change in display area of the output of the first spatial client application (e.g., 1294) does not change a display area of the output of the first spatial display system application (e.g., 1194). In some embodiments a change in resolution of the output of the first spatial client application (e.g., 1294) does not change a resolution of the output of the first spatial display system application (e.g., 1194).

In some embodiments a change in display area of the output of the first spatial client application (e.g., 1294) does change a display area of the output of the first spatial display system application (e.g., 1194). In some embodiments a change in resolution of the output of the first spatial client application (e.g., 1294) does change a resolution of the output of the first spatial display system application (e.g., 1194).

In some embodiments, the multi-region display system changes a resolution of the output of the first spatial display system application (e.g., 1194) responsive to user input of the first spatial display system application. In some embodiments, the multi-region display system changes a display area of the output of the first spatial display system application (e.g., 1194) responsive to user input of the first spatial display system application. In some embodiments, the multi-region display system receives user input of the first spatial display system application via a spatial user input device (e.g., 113, 114) that provides 3-dimensional positional information input received from a user via the spatial user input device.

Multiple Client Devices

In some embodiments, the method 200 includes: the multi-region display system determining that a second client device (e.g., 152) having a second spatial application client device communication module is located within the first viewable region (process S290); responsive to the multi-region display system determining that the second client device is located within the first viewable region, the multi-region display system: accesses second machine-executable program instructions (e.g., retrieves the instructions from a storage device of the multi-region display system, receives the instructions from the second client device, requests the instructions from the second client device) corresponding to a second spatial client application of the second client device via the spatial application network, determines a first position of the second client device within the first viewable region, and establishes a second spatial application display session with the second client device via the first spatial application network (process S291); responsive to establishing the second spatial application display session with the second client device, the multi-region display system executes the second machine-executable program instructions as a second spatial display system application that corresponds to the second spatial client application of the second client device and displaying output of the second spatial display system application by using at least one display region of the multi-region display device that corresponds to the determined first position of the second client device (process S292).

In some embodiments, the method 200 includes: responsive to the multi-region display system determining (e.g., by using a display system computing device) changed spatial application program data of the second spatial display system application, the multi-region display system providing the changed spatial application program data to the second spatial client application of the second client device via the first spatial application network. In some embodiments, spatial application program data includes event data. In some embodiments, spatial application program data includes meta-data.

In some embodiments, the method 200 includes: responsive to the multi-region display system receiving (e.g., by using a display system computing device) changed spatial application program data of the second spatial client application via the first spatial application network, the multi-region display system updates the second spatial display system application by using the received changed spatial application program data.

In some embodiments, the method 200 includes: responsive to the multi-region display system receiving (e.g., by using a display system computing device) user input for the second spatial display system application via a user interface device communicatively coupled to the multi-region display system, the multi-region display system provides the received user input to the second spatial client application of the second client device via the first spatial application network.

In some embodiments, the method 200 includes: responsive to the multi-region display system receiving (e.g., by using a display system computing device) user input for the second spatial client application (e.g., user input provided by the user input device 1292) via the first spatial application network, the multi-region display system updates the second spatial display system application by using the received user input.

In some embodiments, the method 200 includes: responsive to the multi-region display system determining (e.g., by using a display system computing device) a change in position of the second client device from the first position of the second client device to a second position of the second client device within the first viewable region, the multi-region display system displays output of the second spatial display system application by using a display region of the multi-region display device that corresponds to the determined second position of the second client device. In some embodiments, determining a change in position of the second client device from the first position to the second position within the first viewable region includes determining that the change in position exceeds a threshold value.

In some embodiments, at least one display region of the multi-region display device displays at least a portion of the output of the first spatial display system application and at least a portion of the output of the second spatial display system application. For example, output of first spatial display system application and output of the second spatial display system application can overlap in a case where the first client device and the second client device are in close proximity.

Multi-Location

In some embodiments, the multi-region display device is a multi-location multi-region display device (as described herein), and the first viewable region (e.g., 131) is a viewable sub-region of a corresponding first sub-display device of the multi-region display device.

In some embodiments, the first client device is located within a first viewable sub-region of a first sub-display device at a first location, the second client device is located within a second viewable sub-region of a second sub-display device at a second location, the multi-region display system displays output of the first spatial display system application by using a display region of the first sub-display device that corresponds to a position of the first client device, and the multi-region display system displays output of the second spatial display system application by using a display region of the second sub-display device that corresponds to a position of the second client device.

In some embodiments, the multi-region display system displays a first visual indicator by using at least one display region of the first sub-display device, and the multi-region display system displays a second visual indicator by using at least one display region of the second sub-display device, the first visual indicator indicating presence of the second client device within the second viewable sub-region, the second visual indicator indicating presence of the first client device within the first viewable sub-region. In some embodiments, the first visual indicator indicates a real-time state of the second client device within the second viewable sub-region, the second visual indicator indicates a real-time state of the first client device within the first viewable sub-region. In this manner, a user of the first client device can be notified of the presence of the second client device at the remotely located second viewable sub-region of the multi-region display system, and a user of the second client device can be notified of the presence of the first client device at the remotely located first viewable sub-region of the multi-region display system.

Interaction Between Spatial Applications

In some embodiments the multi-region display system determines to communicatively couple the first spatial display system application and the second spatial display system application. In some embodiments, the multi-region display system communicatively couples the first spatial display system application and the second spatial display system application by merging the first spatial application display session and the second spatial application display session. In some embodiments, the multi-region display system communicatively couples the first spatial display system application and the second spatial display system application by: providing spatial application program data and user input of the first spatial display system application to the second spatial display system application; and providing spatial application program data and user input of the second spatial display system application to the first spatial display system application. In some embodiments, the multi-region display system provides spatial application program data and user input of the first spatial display system application to the second spatial client application; and provides spatial application program data and user input of the second spatial display system application to the first spatial client application.

In some embodiments the multi-region display system determines to communicatively couple the first spatial display system application and the second spatial display system application based on user input received by the multi-region display system (e.g., via a wand 113, 114). In some embodiments the multi-region display system determines to communicatively couple the first spatial display system application and the second spatial display system application based on proximity of the first client device (e.g., 151) to the second client device (e.g., 152).

In some embodiments, the first spatial display system application communicatively couples to the second spatial display system application by subscribing to spatial application program data and user input of the second spatial display system application. In some embodiments, the second spatial display system application communicatively couples to the first spatial display system application by subscribing to spatial application program data and user input of the first spatial display system application.

In some embodiments, the first spatial display system application and the second spatial display system application are communicatively coupled by establishing a communication session with a same pool as described in US-2015-0077326, the contents of which is incorporated in its entirety by this reference. In some embodiments, the pool receives spatial application program data and user input of the first spatial display system application and spatial application program data and user input of the second spatial display system application; the first spatial display system application accesses the spatial application program data and user input of the second spatial display system application from the pool by using a spatial application display system communication module (e.g., 1193) of the respective display system computing device (e.g., 102, 103); and the second spatial display system application accesses the spatial application program data and user input of the first spatial display system application from the pool by using a spatial application display system communication module (e.g., 1193) of the respective display system computing device (e.g., 102, 103).

In some embodiments, in a case where the first spatial display system application and the second spatial display system application are communicatively coupled, and responsive to user input (e.g., received via a wand 113, 114) indicating transfer of selected data from the first spatial display system application to the second spatial display system application, the multi-region display system transfers the selected data and updates output of at least the second spatial display system application to indicate the transfer of the selected data, wherein the user input is user input of one of the first spatial display system application and the second spatial display system application.

Visual Indicators

In some embodiments, the multi-region display system displays a visual indicator that corresponds to user input of the first spatial display system application. In some implementations, the visual indicator is a cursor. In some embodiments, the visual indicator corresponds to user input provided by a pointing device (e.g., 113, 114). In some embodiments, the multi-region display system displays the visual indicator that corresponds to user input of the first spatial display system application by using at least one display region (e.g., 121-124) of the display system. In some embodiments, a display region used for output of the first spatial display system application displays the visual indicator. In some embodiments, a display region used for output of the second spatial display system application displays the visual indicator. In some embodiments, a display region used for output of the first spatial display system application and a display region used for output of the second spatial display system application each display the visual indicator. In some embodiments, a display region different from a display region used for output of the first spatial display system application and a display region used for output of the second spatial display system application displays the visual indicator. In some embodiments, the visual indicator spans multiple display regions.

In some embodiments, the multi-region display system displays a visual indicator that corresponds to user input of the second spatial display system application, and the multi-region display system displays a visual indicator that corresponds to user input of the second spatial display system application in manners similar to those described herein for display of the visual indicator that corresponds to user input of the first spatial display system application.

In some embodiments, the multi-region display system displays an application interaction visual indicator that indicates that the first spatial display system application and the second spatial display system application are communicatively coupled. In some embodiments, the application interaction visual indicator depicts the data-flow and interactions between the first spatial display system application and the second spatial display system application.

In some embodiments, the multi-region display system displays a manipulation visual indicator that indicates transfer of selected data from the first spatial display system application to the second spatial display system application.

In some embodiments, the multi-region display system displays a manipulation visual indicator that indicates manipulation of selected data of the first spatial display system application by the second spatial display system application.

In some embodiments, the multi-region display system displays a manipulation visual indicator that indicates manipulation of the first spatial display system application responsive to user input of the second spatial display system application.

In some embodiments, the multi-region display system displays a manipulation visual indicator that indicates control of the first spatial display system application responsive to user input of the second spatial display system application.

In some embodiments, the multi-region display system controls the first spatial display system application responsive to user input of the second spatial display system application.

Augmented Functionality

In some embodiments, the first spatial display system application includes functionality that is augmented with respect to functionality of the first spatial client application. In some embodiments, the first machine-executable instructions include instructions that when executed by a client device provide an indication that the client device is executing the application, and that when executed by a display system computing device provide an indication that the display system computing device is executing the application. In this manner, the spatial application is device-aware meaning that it can operate differently based on the device that is executing the application. In some embodiments, when executed by the multi-region display system, a spatial application has additional functionality as compared to when the spatial application is executed by a client device.

Display System Computing Device

In some embodiments, at least one display system computing device of the multi-region display system is included in the first client device.

In some embodiments, at least one display system computing device of the multi-region display system is a virtual machine running on the first client device.

4. FIGS. 3-10

FIGS. 3-10 are illustrations of interactions between the multi-region display system and client devices, in accordance with embodiments.

Figure 3:
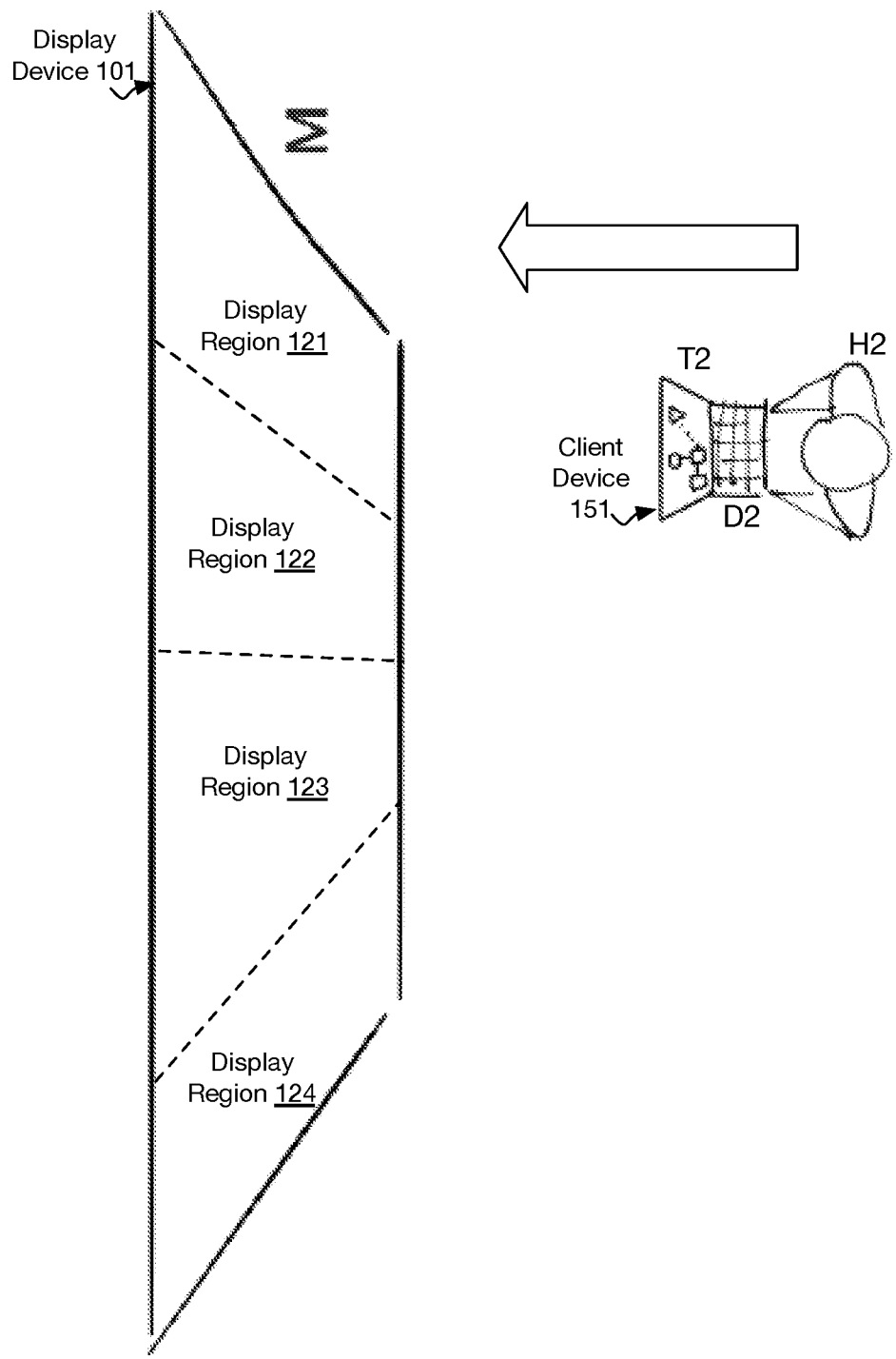
FIGS. 3-10 are illustrations of interactions between the multi-region display system and client devices, in accordance with embodiments.
Figure 4:
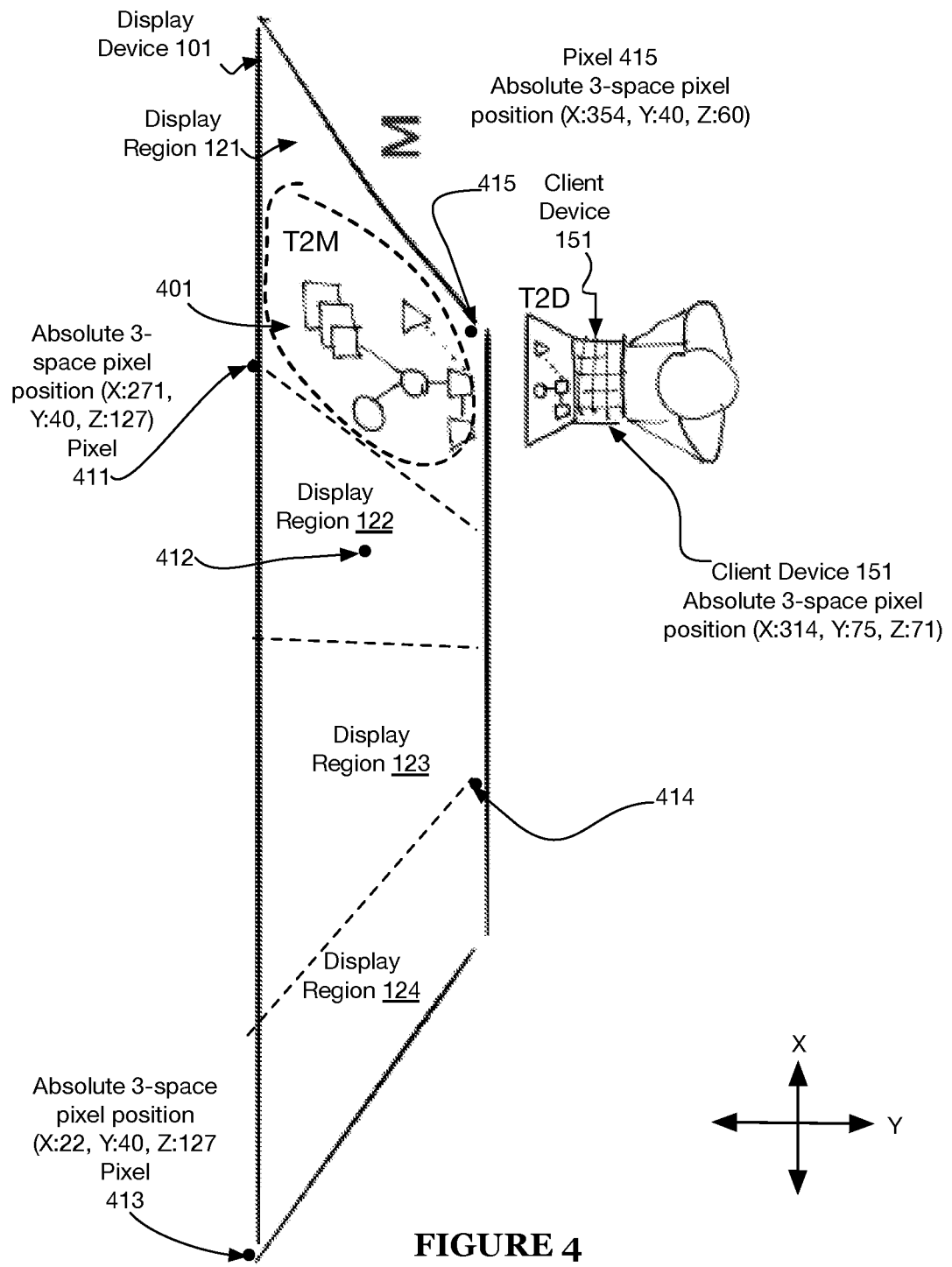

In some embodiments, as shown in FIGS. 3-10, a collection of computational client devices (e.g., 151, 152) D_i are individually carried and operated by humans H_i. Each device D_i runs one or more applications (e.g., 1294) or tasks T_i_j. A manifold M (e.g., multi-region display device 101) includes a continuum of pixels backed by computation. In some embodiments, different regions (e.g., 121-124) of pixels are driven by logically and physically disjoint processors (e.g., processors of 102, 103), but with a fine-grained degree of coordination that allows display and interaction to nonetheless remain continuous across pixel boundaries separating regions of distinct cpu control. In some embodiments, the D_i (e.g, 151, 152) are spatially tracked, explicitly or implicitly, so that their absolute positions (e.g., in the frame of reference established by M) are known in real time. A device D_i being brought into initial proximity with M (FIG. 3), synchronized interface elements (visual indicators) appear on D_i and M to indicate that 'pairing' is possible. A subsequent logical threshold (temporal, spatial, etc.) being crossed, the prenominate interface elements (visual indicators) evolve to indicate that pairing has been established, and one or more of the tasks T_i_j (e.g., of 1294) resident on D_i extend to occupy a region of pixels on M proximal to D_i (FIG. 4). A version of T_i_j (e.g., 1194) is at this point computationally resident on M (e.g., running on the computation backing the manifold's pixels). In some embodiments, M will not previously have been in possession of the code or data comprising T_i_j (e.g., 1294); transfer of one or both of code and data from D_i (e.g., 151, 152)—or from a proxy or server ("cloud")—to M may occur in the interval between initial proximity and pairing. The operator H_i may in addition to the computational device D_i (e.g., 151, 152) wield a control device W_i (e.g., 113, 114) whose properties (e.g. spatial pointing, one or more buttons) allow direct manipulation of the application T_i_j as resident on M (e.g., 1194). The two instantiations of T_i_j—on D_i (e.g., 1294) and M (e.g, 1194), so "T_i_j(d)" and "T_i_j(m) respectively"—are independent of each other but in ongoing communication so that manipulation of T_i_j(d) (e.g., 1294) on D affects T_i_j(m) (e.g. 1194) and, conversely, manipulation of T_i_j(m) (e.g. 1194) affects T_i_j(d) (e.g. 1294). In some embodiments, in a cognitively significant arrangement of the foregoing, distinction between T_i_j(d) and T_i_j(m) is evident. In some embodiments, there is no cognitive distinction between T_i_j(d) and T_i_j(m), so that T_i_j(m) seems from the point of view of H_i and other participants simply like a continuous extension of T_i_j(d) onto M—a 'borrowing' by D_i of some of M's pixels to provide a larger canvas for T_i_j(d). As H_i, carrying D_i (e.g., 151, 152) and perhaps W_i (e.g., 113 114), moves parallel to M, T_i_j(m) may translate accordingly, so as to remain physically proximal to T_i_j(d) on D_i. In some embodiments, upon initial proximity, D_i and its T_i_j(d) transmits to M descriptive metadata. The metadata may include fixed parameters, formulae, executable code, and combinations of these. Some of this metadata serves to allow M to manage the spatial and other perceptible properties as T_i_j(m) manifests.

Figure 7:
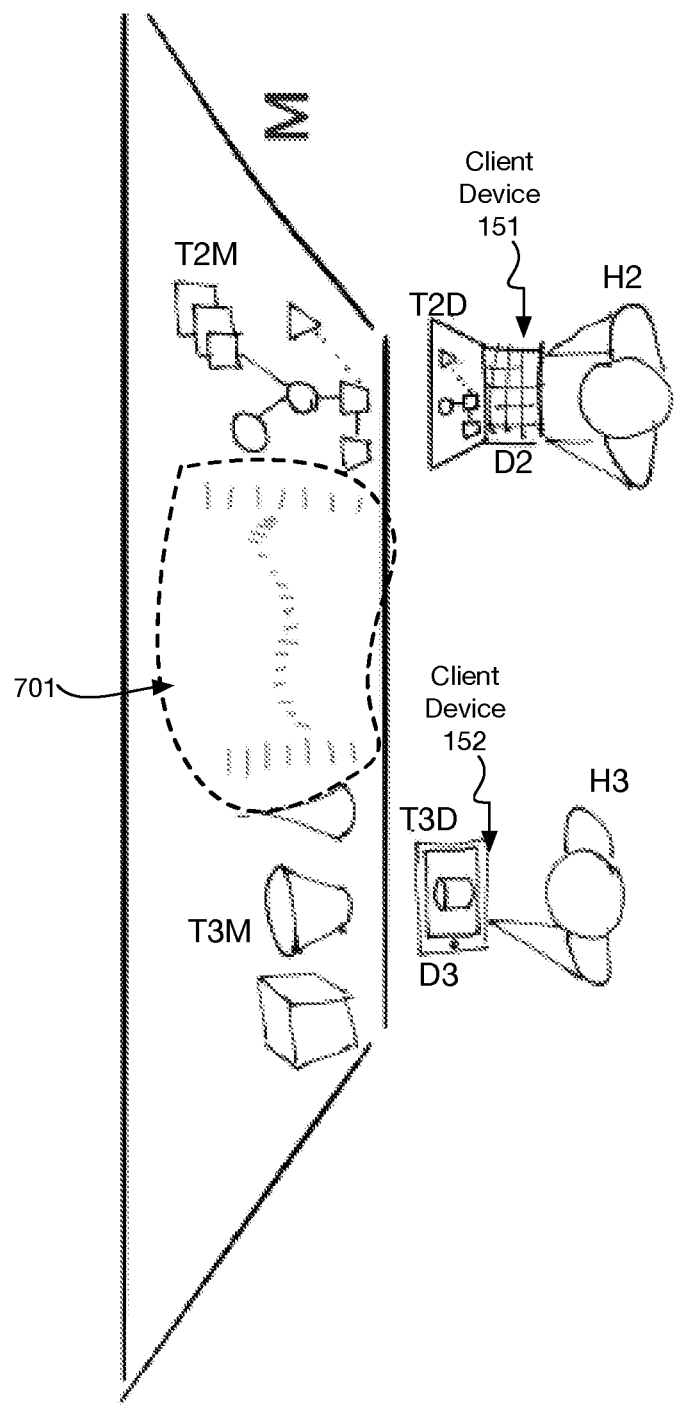

FIGS. 5-10 depict plural client devices (e.g., 151, 152) interacting with the multi-region display system (e.g., 100). In a case where H_2 (operating D_2, e.g., 151), H_3 (operating D_3, e.g., 152), and potentially others are simultaneously present before M (FIGS. 5-6), M may mediate transactions between T_2 and T_3 (and T_ ... _ ... ). Interface elements on both M and D_2, D_3 depict the data-flow and interactions between T_2 and T_3, and may also offer H_2 (via D_2 and W_2) and H_3 (via D_3 and W_3) control, over such flows and interactions (FIG. 7). Given appropriate metadata from each of the D_2, D_3, M can enable meaningful interaction between and among T_2, T_3, et al. even when the respective T_2, T_3 have no foreknowledge of each other.

In some embodiments, in a further elaboration of the entire scenario foregoing, pixel manifold M may include a plurality of individual submanifolds M_r (e.g., a multi-region sub-display device) separated from each other by an arbitrary distance—in the typical situation, disposed so that no user within a viewable region of an M_r can see another M_r. In this variant, disjoint subsets of the H_i (and corresponding D_i) are present at each M_r. Then at each M_r, extended interface elements (visual indicators) may depict the existence and real-time state of H_i, D_i, and T_i_j present at the other M_r. In this way, all H_i are granted awareness of and interactional opportunity with respect to all other H_i, irrespective of proximity or remoteness, substantially as if all H_i were co-present at a singular M.

5. FIGS. 13-15

Figure 13:
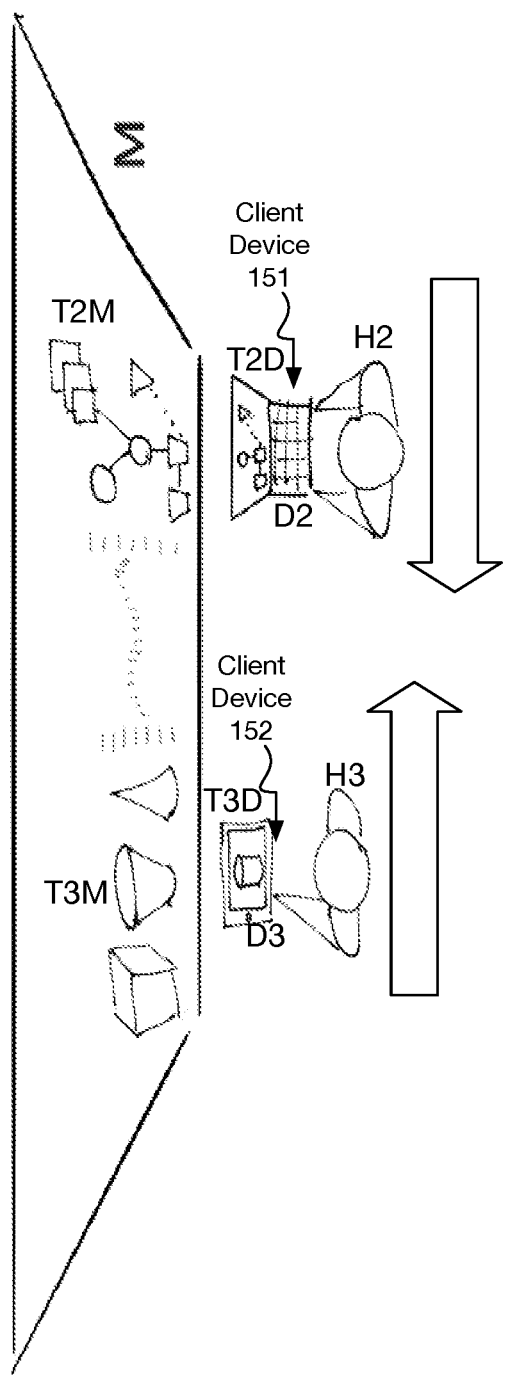
FIGS. 13-15 are illustrations of interactions between the multi-region display system and client devices, in accordance with embodiments.
Figure 14:
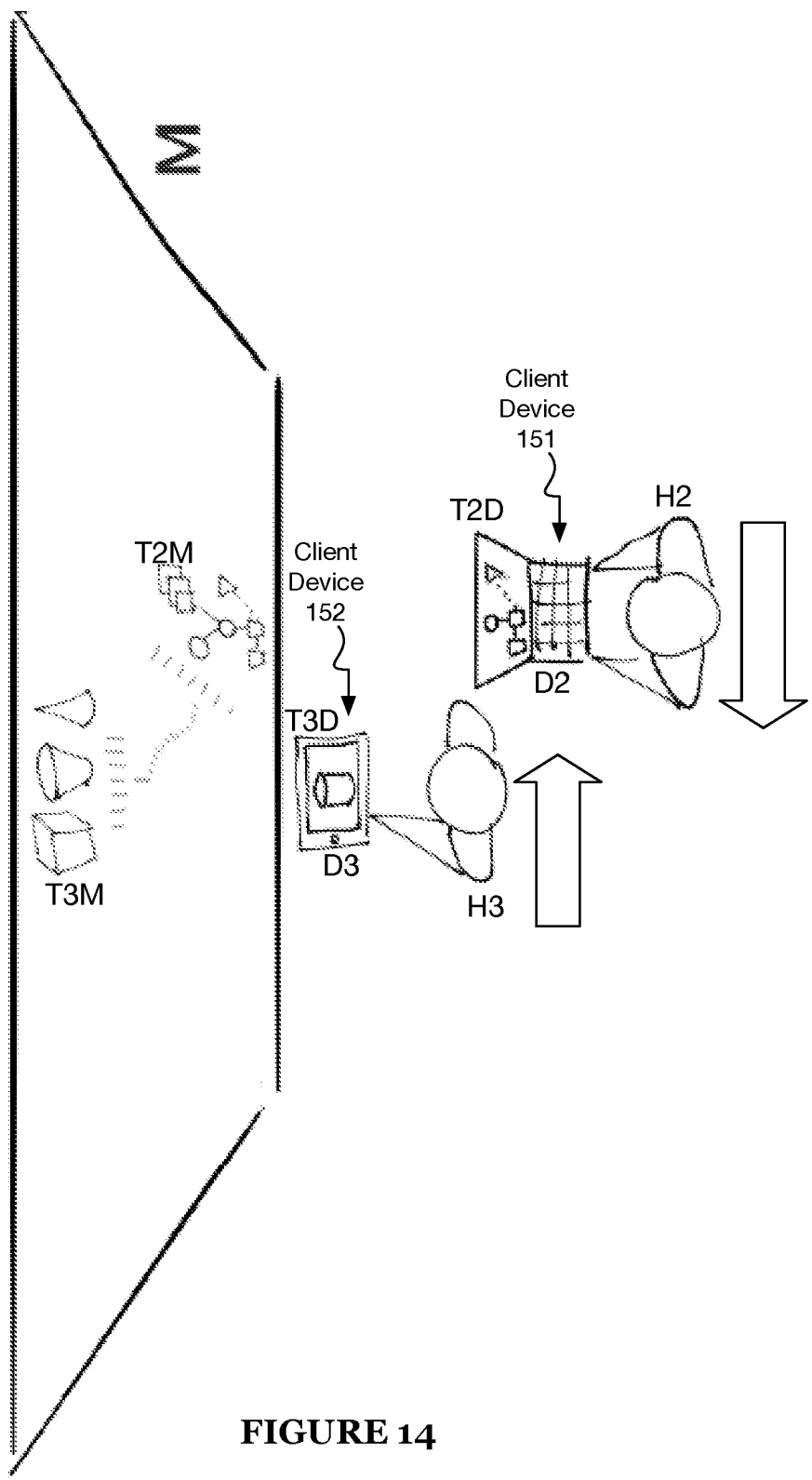
Figure 15:
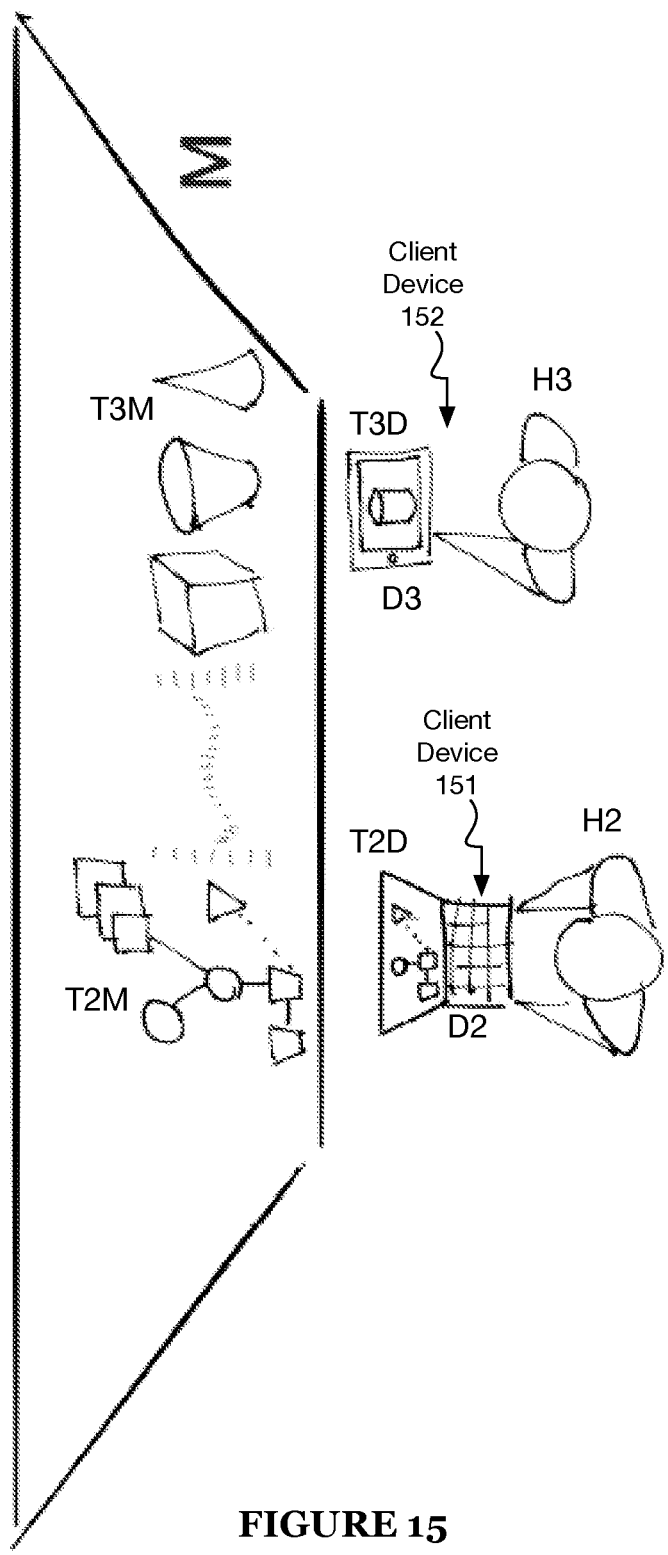

FIGS. 13-15 are illustrations of interactions between the multi-region display system and client devices, in accordance with embodiments.

Figure 5:
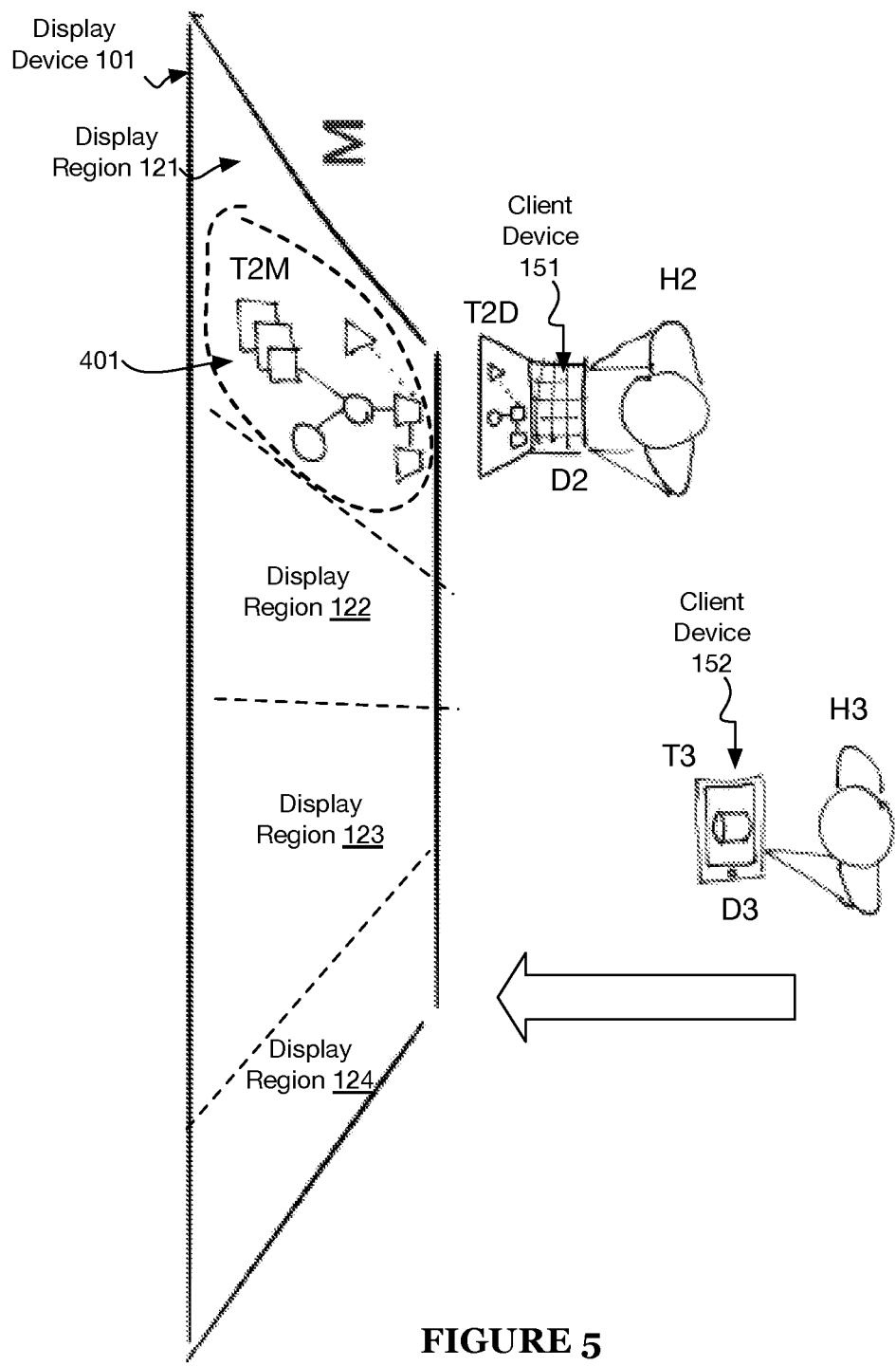
Figure 6:
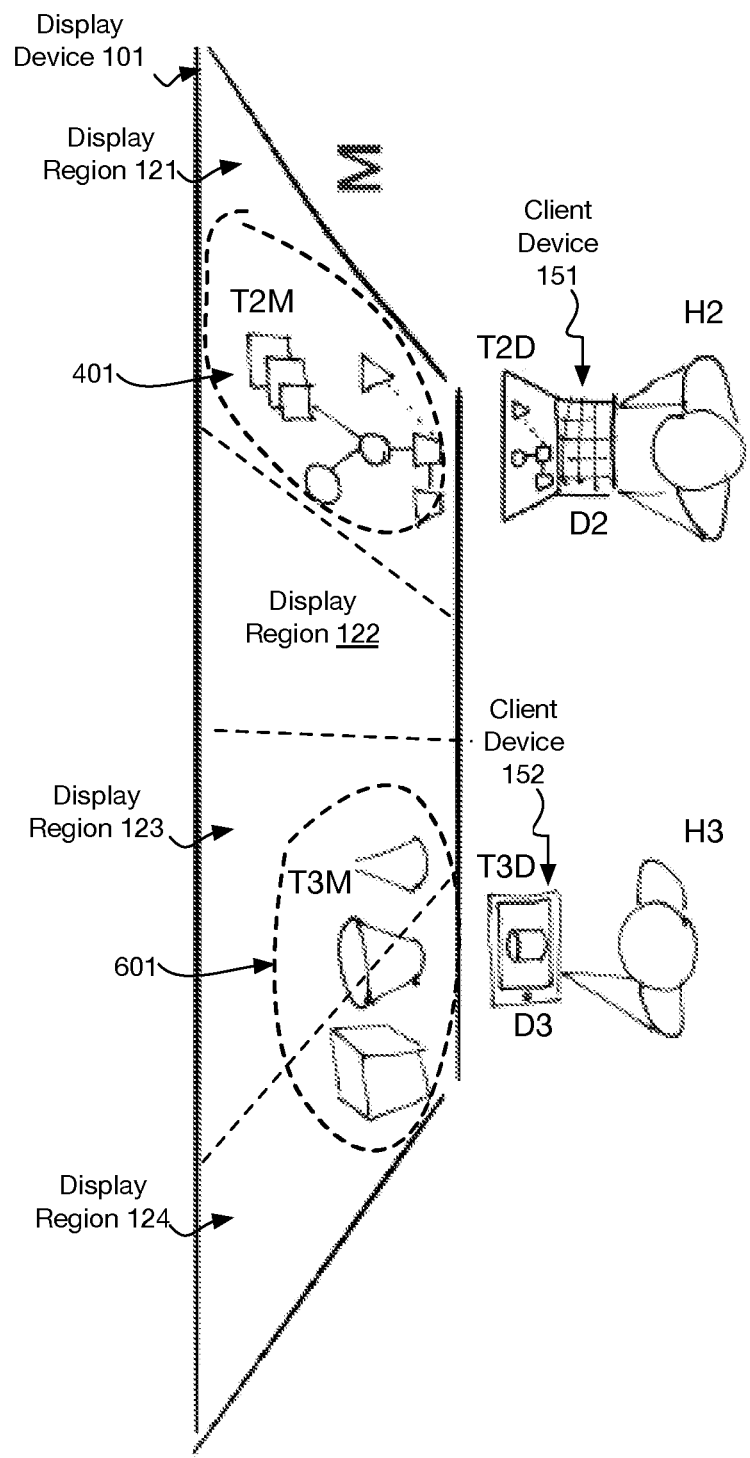

In some embodiments, FIG. 13 depicts an interaction that occurs after the state depicted in FIG. 5.

FIGS. 13-15 illustrate an interaction according to an embodiment in which two participants (H2, H3) swap places in front of the big pixel space (M), and the pixel-extensions of their applications (T2m, T3m) gracefully slip over/under each other. As illustrated in FIGS. 13-15, the pixel regions (of M) assigned to each device (D2, D3) are not fixed but rather assigned in a fluid manner that changes over time (in response to the position of the human (H2, H3)/device (D2, D3) of origin, the presence and proximity of others, the extended scale at which the application (T2d, T3d) "wants" to work, etc.).

As shown in FIG. 13 participants H2 and H3 begin to change positions. As shown in FIG. 14, as H2 and H3 change positions, the position of the output of the respective spatial display system applications (T2m and T3m) moves across the display device M. As shown in FIG. 15, as H2 and H3 and the output of the respective spatial display system applications (T2m and T3m) have switched positions with respect to the display device M.

6. FIG. 16

Figure 16:
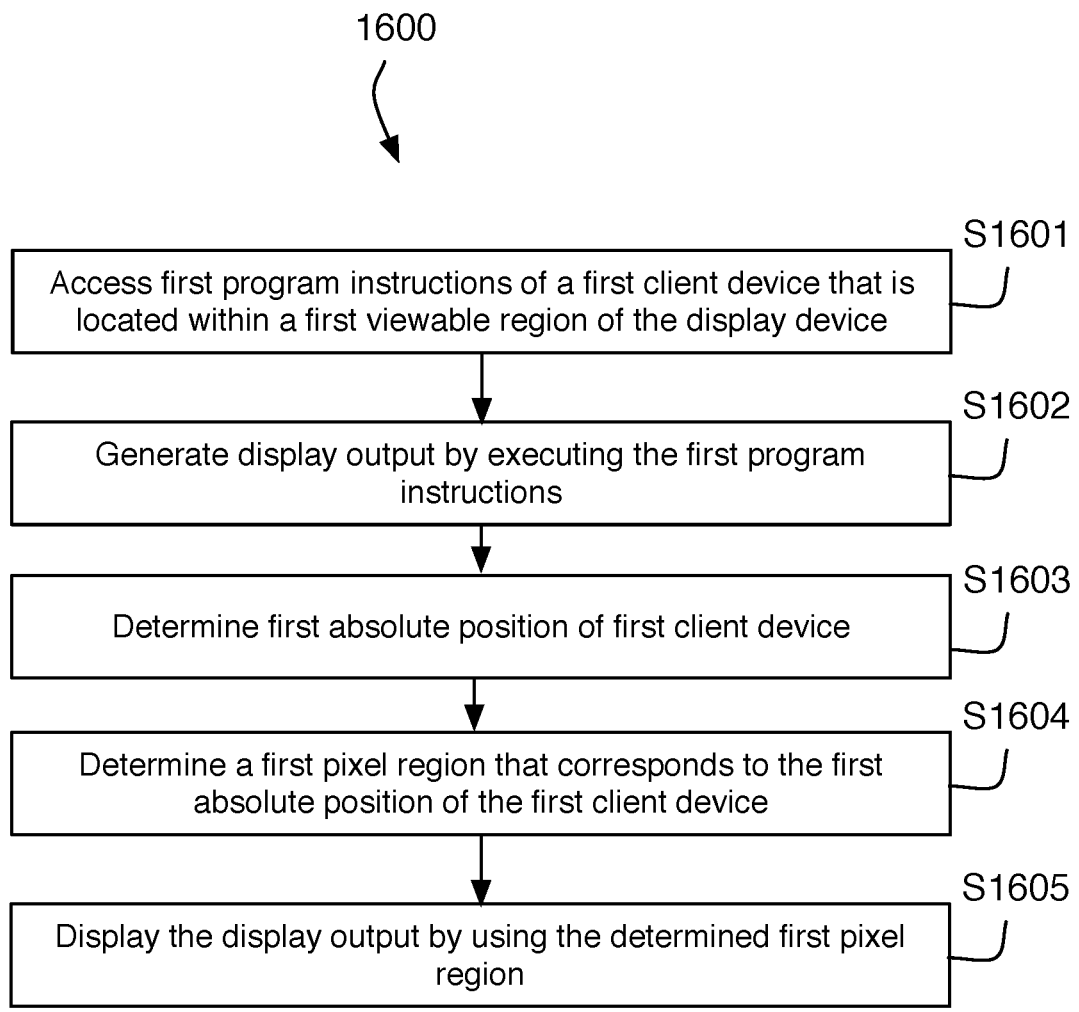
FIG. 16 is a flowchart representation of a method in accordance with embodiments.

FIG. 16 is a flowchart representation of a method 1600 in accordance with embodiments. In some embodiments, the method 1600 is performed by a display system that includes a display device and a display system computing system (e.g., 198 of FIG. 1). In some embodiments, the method 1600 is performed by a display system computing system (e.g., 198 of FIG. 1) that is communicatively coupled to a display device. In some embodiments, the display system computing system includes a single display system computing device (e.g., 102 of FIG. 1). In some embodiments, the display system computing system includes a plurality of display system computing devices (e.g., 102 and 103 of FIG. 1) that are communicatively coupled to each other. In some embodiments, each display system computing device includes a spatial application display system communication module (e.g., 1193 of FIG. 11). In some embodiments, each display system computing device is communicatively coupled to a first spatial application network via the respective spatial application display system communication module. In some embodiments, the display system computing system includes a plurality of display system computing devices, and each display system computing device is communicatively coupled to the other display system computing devices via the first spatial application network. In some embodiments, the display system includes a tracking system (e.g., 110 of FIG. 1). In some embodiments, the tracking system is communicatively coupled to each display system computing device of the display system computing system. In some embodiments, the tracking system is communicatively coupled to each display system computing device of the display system computing system via the first spatial application network.

In some embodiments, the display device is a multi-region display device (e.g., 101 of FIG. 1) that includes a plurality of display regions (e.g., 121-124). In some embodiments, each display region includes a plurality of pixels.

Figure 18:
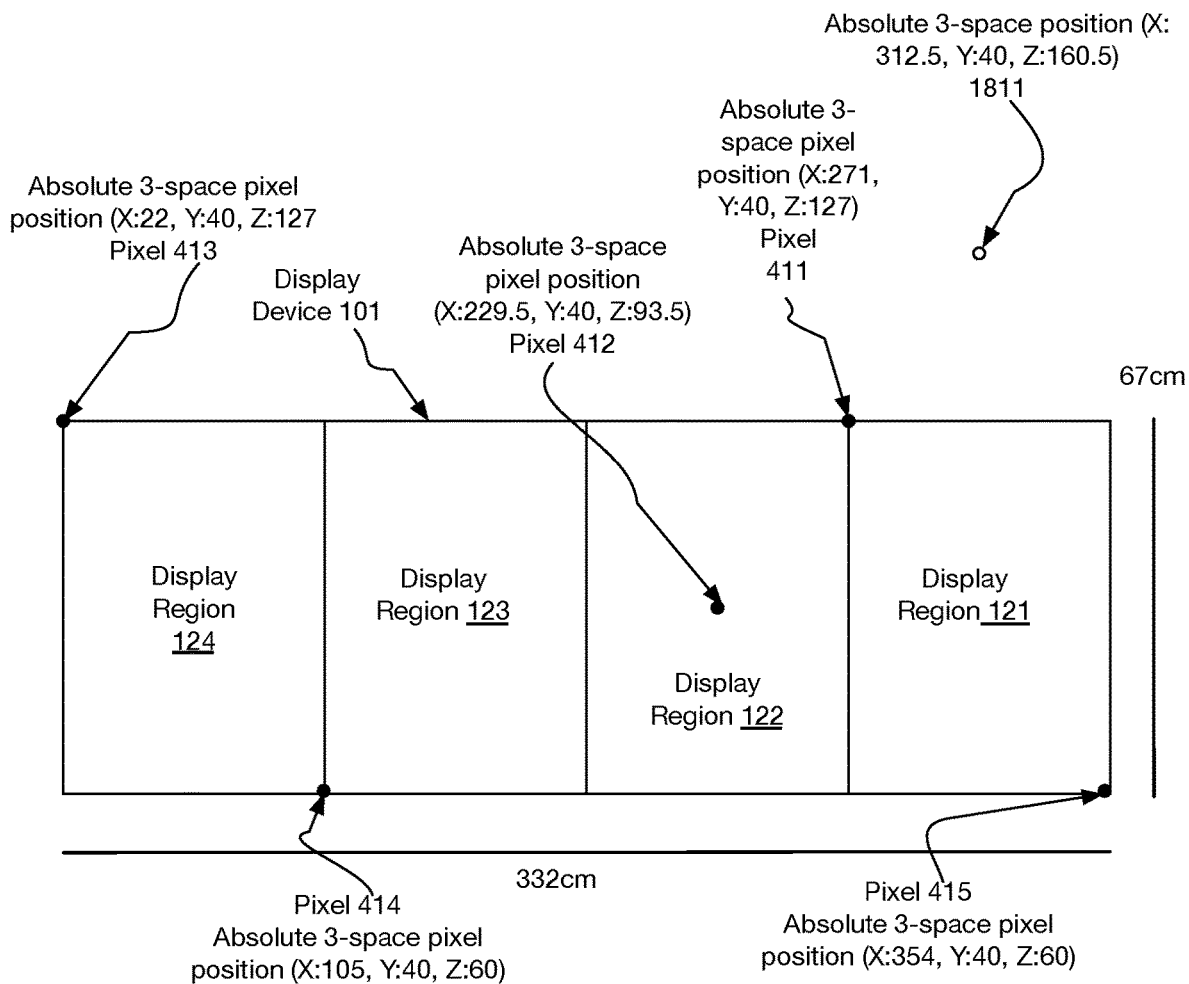
FIG. 18 is a schematic representation of a display device in accordance with embodiments.
Figure 18:
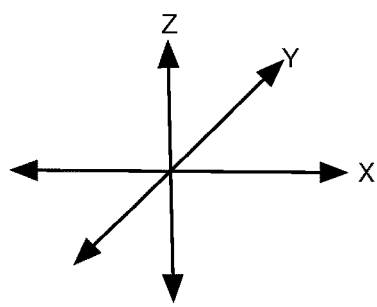

In some embodiments, each pixel of the display device is associated with an absolute position in a three-dimensional coordinate space, such that movement of the display device within the coordinate space results in a change in the absolute position of each pixel of the display device. As shown in FIG. 18, each pixel 411-415 of the display device 101 has an absolute 3-space position within a three-dimensional coordinate space, and movement of the display device 101 within the coordinate space results in a change in the absolute position of each of the pixels 411-415.

In some embodiments, the method 1600 includes: accessing first program instructions of a first client application (e.g., T2D of FIG. 4, 1294 of FIG. 12) of a first client device (e.g., 151 of FIG. 1) that is located within a first viewable region (e.g., 131 of FIG. 1) of a display device (e.g., 101 of FIG. 1) (process S1601); generating display output (e.g., 401 of FIG. 4) of a first display system application (e.g., T2M of FIG. 4, 1194 of FIG. 11) by executing the accessed first program instructions (process S1602); determining a first absolute position of the first client device (process S1603); determining a first pixel region of the display device that corresponds to the first absolute position of the first client device (process S1604); and displaying the display output of the first display system application (e.g., T2M of FIG. 4) by using the determined first pixel region (process S1605). In some embodiments, the method 1600 includes determining a display area for the display output (e.g., 401) of the first display system application (e.g., T2M of FIG. 4). In some embodiments, determining a first pixel region of the display device that corresponds to the first absolute position of the first client device includes: determining a first pixel region of the display device that corresponds to the determined display area and the first absolute position of the first client device.

In some embodiments, the determined display area is specified by a width and height in units of pixels. In some embodiments, the first pixel region is a group of contiguous pixels of the display device. In some embodiments, the first pixel region is included in a single display region (e.g., 121-124) of the display device. In some embodiments, the first pixel region spans two or more display regions (e.g., 121-124) of the display device. In some embodiments, determining a first pixel region of the display device that corresponds to the determined display area and the first absolute position of the first client device includes determining a group of contiguous pixels having a width equal to a width of the display area and a height equal to a height of the display area.

In some embodiments, the first absolute position is an absolute position within a three-dimensional coordinate space, and the absolute position of each pixel of the display device (e.g., pixels 411-415 of FIGS. 4 and 18) is an absolute position within the three-dimensional coordinate space. As shown in FIG. 18, the three-dimensional coordinate space extends beyond the display area of the display device 101, and includes a position 1811 that is included in the three-dimensional coordinate space but is not a position within the display area of the display device 101. As shown in FIG. 18, the coordinate positions are shown in units of centimeters, and each display region has a width of 83 cm and a height of 67 cm. The width of each display region corresponds to the X-axis of the coordinate space, and the height of each display region corresponds to the Z-axis of the coordinate space. The position of pixel 413 has an absolute position of {X:22, Y:40, Z:127} relative to the origin of the coordinate space of FIG. 18.

In some embodiments, the three-dimensional coordinate space is a coordinate space relative to the display device (e.g., 101). In some embodiments, the three-dimensional coordinate space is a coordinate space of a room (e.g., 199). In some embodiments, the three-dimensional coordinate space is a coordinate space of the viewable region (e.g., 131). In some embodiments, the first absolute position of the first client device is an absolute position in a frame of reference of the display device (e.g., 101).

In some embodiments, the determined display area is a predetermined display area. In some embodiments, determining a display area for the display output of the first display system application includes: determining a display area for the display output of the first display system application based on a distance between the display device and the first client device as determined by the first absolute position of the first client device and an absolute position of the display device. In some embodiments, determining a display area for the display output of the first display system application includes: determining a display area for the display output of the first display system application based on a distance between the display device and the first client device as determined by the first absolute position of the first client device and an absolute position of the display device, the display area increases as the distance increases, and the display area decreases as the display system decreases.

In some embodiments, the method 1600 includes: the display system computing system determining that the first client device is located within the first viewable region.

In some embodiments, determining that the first client device is located within the first viewable region includes:

determining that the first client device is located within the first viewable region based on information received from the first client device.

In some embodiments, determining that the first client device is located within the first viewable region includes: determining that the first client device is located within the first viewable region based on information received from a tracking system (e.g., 110 of FIG. 1).

As shown in FIG. 3, the client device 151 approaches the display device lot and enters the viewable region of the display device lot. As shown in FIG. 4, the computing system 198 accesses program instructions from the first client device 151 and generates display output by executing the accessed program instructions. The computing system 198 determines the absolute position of the client device 151 ({X:314, Y:75, Z:71} shown in FIG. 4) and determines a display area (e.g., width×height in pixels) for the display output. The computing system 198 determines a pixel region within the display region 121 that corresponds to the display area (e.g., having a width×height in pixels that matches the width×height of the display area), and that is located proximate to the client device 151. As shown in FIG. 4, the client device 151 is closest to the pixels of the display region 121, as compared to the pixels of the other display regions 122-124. The computing system 198 displays the display output 401 by using the determined pixel region within the display region 121. In some embodiments, the absolute positions of the pixels change in a case where the display device 101 moves. For example, if the display device 101 moves in the X-direction such that the display region 122 becomes the display region closest to the client device 151, the absolute positions of the pixels of the display region 122 change to reflect the movement of the display device, and thus the computing system determines the display region 122 as being closest to the client device 151 based on the absolute positions of the pixels and the client device 151.

Change in Position

In some embodiments, the method 1600 includes: the computing system using a tracking system (e.g., 110 of FIG. 1) to spatially track absolute position of the first client device in real time. In some embodiments, responsive to a change of position of the first client device from the first absolute position to a second absolute position, the computing system: determines a second pixel region of the display device that corresponds to the determined display area and the second absolute position of the first client device, and displays the display output (e.g., 401) of the first display system application by using the determined second pixel region. In some embodiments, the computing system determines the first absolute position of the first client device by using the tracking system.

For example, and with reference to FIG. 4, in a case where the client device 151 moves along the X-axis towards the display region 124, the absolute position of the client device 151 changes, and the computing system updates the display position of the display output (e.g., 401) to follow client device 151. FIGS. 13-15 depict movement of the client device 151 along the X-axis towards the display region 124, with the display output of the client device 151 following the client device 151.

Determining a Pixel Region

In some embodiments, determining the first pixel region of the display device (process S1605) includes: determining at least a first pixel having an absolute position that corresponds to the first absolute position of the first client device, and determining a pixel region that has an area (e.g., width×height in units of pixels) of the determined display area, and that has the first pixel as a center pixel of the pixel region.

In some embodiments, determining at least a first pixel having an absolute position that corresponds to the first absolute position of the first client device includes: determining at least a first pixel having an absolute position that is proximate to the first absolute position of the first client device, and the computing system 198 determines the absolute position of the first pixel based on absolute positions stored for each pixel of the display device. In some embodiments, during a calibration process, absolute positions for each pixel of the display device are determined and stored in a storage device accessible by the computing system 198.

In some embodiments, determining at least a first pixel having an absolute position that corresponds to the first absolute position of the first client device includes: determining at least a first pixel having an absolute position that is proximate to the first absolute position of the first client device, and the computing system computes the absolute position of the first pixel based on stored absolute position information for at least one pixel of the display device and information indicating relative position of the first pixel within the display device. In some embodiments, during a calibration process, an absolute position of a corner pixel of the display device (e.g., pixel 413 of FIG. 4) is determined and stored in a storage device accessible by the computing system 198, information indicating position of the first pixel relative to a position of the corner pixel is stored, and the absolute position of the first pixel is calculated based on the stored absolute information for the corner pixel and the stored information indicating position of the first pixel relative to a position of the corner pixel.

Changed Program Data

In some embodiments, the method 1600 includes: responsive to changed program data (e.g., 1294 of FIG. 12) of the first client application, the computing system updating the first display system application (e.g., 1194 of FIG. 11) by using the received changed program data of the first client application.

User Input from Tracking System

In some embodiments, the method 1600 includes: the computing system (e.g., 198) using the tracking system (e.g., 110) to spatially track absolute position and orientation of a first user input device (e.g., 113, 114 of FIG. 1, want 902 of FIG. 9) in real time; the computing system generating user input information based on the spatial tracking of the absolute position and orientation of a first user input device in real time; the computing system determining whether the generated user input information corresponds to the display output (e.g., 901) of the first display system application (e.g., 1194 of FIG. 11); responsive to a determination that the generated user input information corresponds to the display output of the first display system application, the computing system: updating the first display system application by using the user input information, and providing the user input information to the first client application (e.g., 1294 of FIG. 12).

In some embodiments, the first user input device is an input device of a user of the first client device (e.g., 151). In some embodiments, the first user input device is an input device of a user of a second client device (e.g., 152).

In some embodiments, determining whether the generated user input information corresponds to the display output of the first display system application includes: determining a cursor position of the first user input device based on the user input information, wherein the cursor position is a position of a cursor displayed by the display device; determining whether the cursor position is a position within display output of the first display system application; and in a case where the cursor position is a position within display output of the first display system application, the computing system determining that the generated user input information corresponds to the display output of the first display system application.

Figure 9:
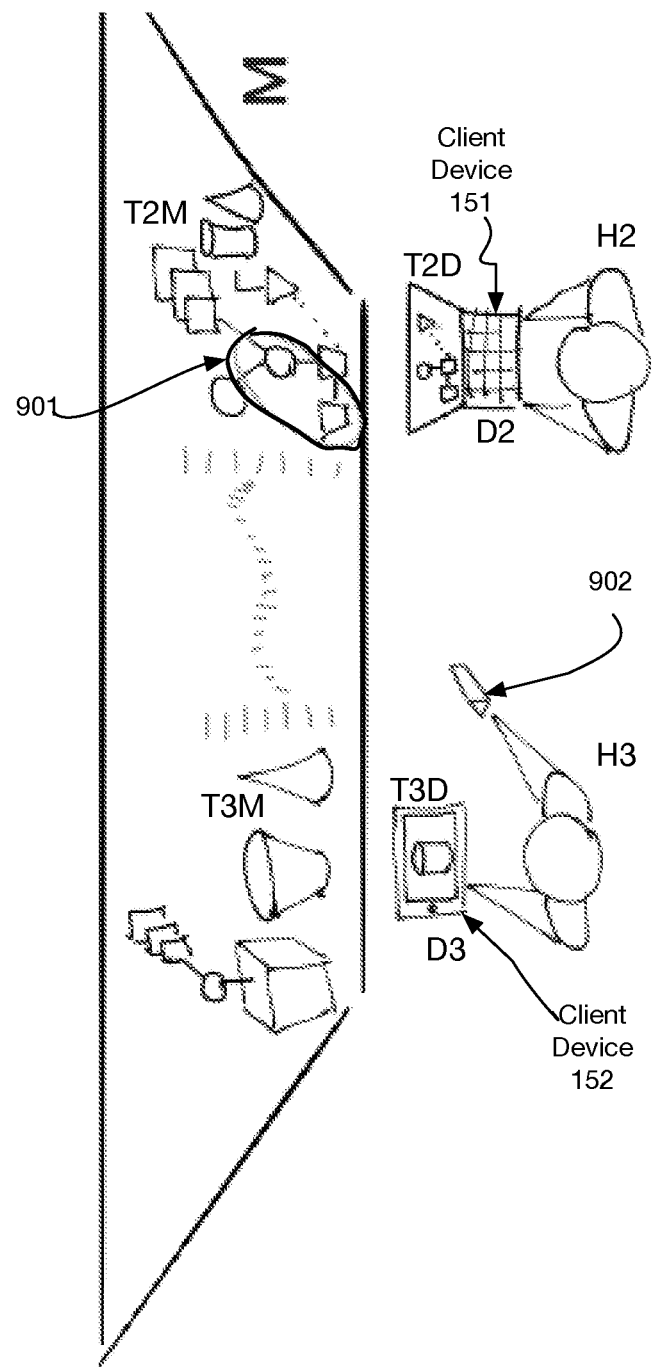
Figure 10:
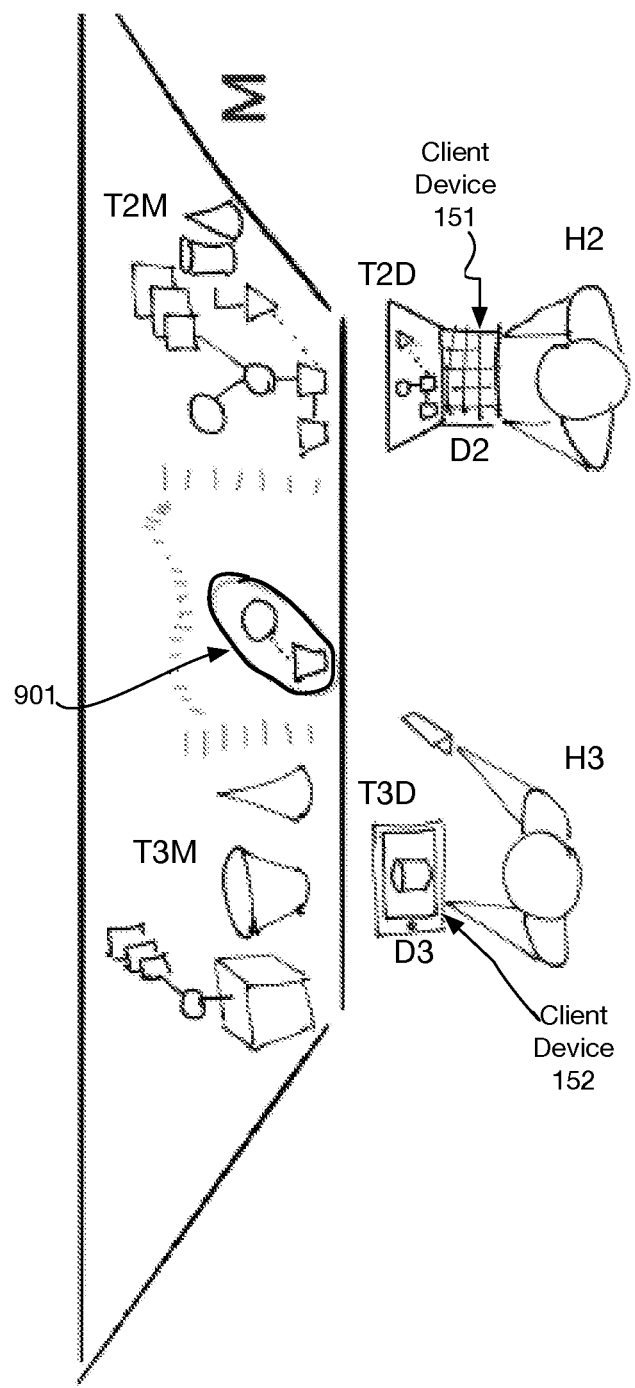

As shown in FIG. 9, the computing system (e.g., 198) uses the tracking system (e.g., 110) to spatially track absolute position and orientation of the wand 902 in real time. The computing system generates user input information based on the spatial tracking of the wand 902. The computing system determines that the generated user input information corresponds to selection of the display output (e.g., 901) of the first display system application (e.g., 1194 of FIG. 11) by the wand 902. Accordingly, the computing system updates the first display system application by providing the user input information indicating selection of the display output 901. The computing system also provides the user input information to the first client application (e.g., 1294 of FIG. 12) of the client device 151. As shown in FIG. 10, the computing system generates user input information based on the spatial tracking of the wand 902 that corresponds to transfer of the data represented by the display output 901 away from the first display system application, towards the second display system application.

As shown in FIGS. 9-10, the wand 902 is a user input device of a user of the client device 152, and the wand 902 is used to manipulate data of a display system application that corresponds to client device 152. In this manner, collaboration among users of different client devices is provided. In some embodiments, any user input device tracked by the tracking system 110 can be used to manipulate data of any display system application whose program instructions are executed by the computing system 198.

Determining Absolute Position

In some embodiments, the first absolute position of the first client device is determined by using a tracking sensor array (e.g., 111 of FIG. 1) of the first viewable region. In some embodiments, the tracking sensor array is a sensor array of the tracking system (e.g., 110 of FIG. 1).

In some embodiments, the first absolute position of the first client device is determined by using at least one of an optical sensor and a camera of the first client device. In some embodiments, the first client device is communicatively coupled to the display system computing system (e.g., 198), the first client device generates an image of the display device (e.g., 101), the first client device generates absolute position information from the image of the display device, and the first client device provides the absolute position information to the display system computing system.

In some embodiments, the first client device generates an image of the display device by using an optical sensor of the first client device. In some embodiments, the first client device generates an image of the display device by using a camera of the first client device. In some embodiments, the absolute position information indicates the first absolute position of the first client device. In some embodiments, the display system computing system generates the first absolute position of the first client device by using the absolute position information provided by the first client device. In some embodiments, the display device includes at least one marker, the image of the display device includes an image of the at least one marker, and the absolute position information includes marker information generated by the first client device from the image of the display device. In some embodiments, the display system computing system accesses stored marker absolute position by using the marker information of the absolute position information, and the display system computing system generates the absolute position of the first client device based on the marker absolute position.

In some embodiments, the first absolute position of the first client device is determined by using at least one of an optical sensor and a camera of a user input device (e.g., 113, 114 of FIG. 1).

Multi-Location

Figure 17:
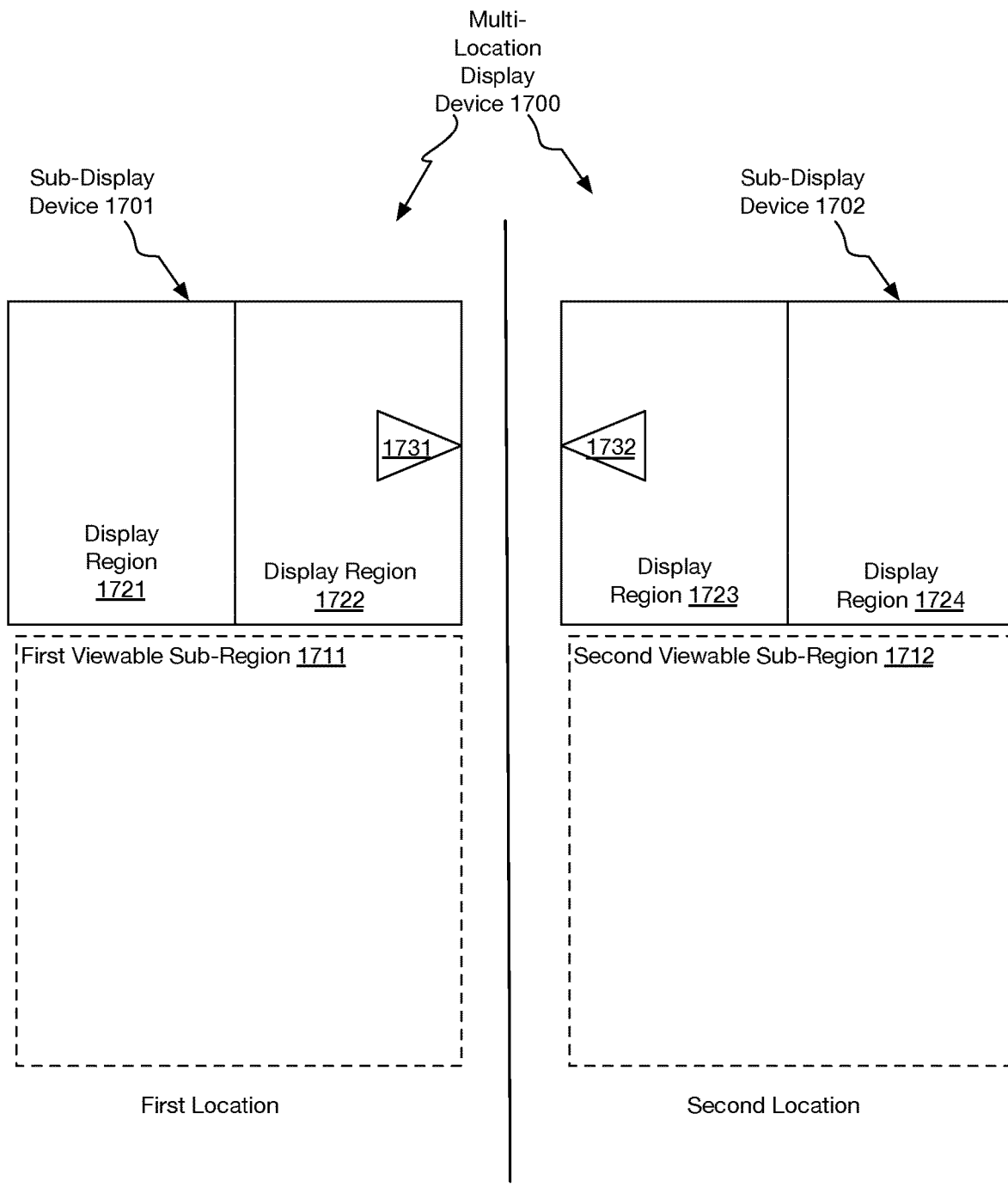
FIG. 17 is a schematic representation of a multi-location display device in accordance with embodiments.

In some embodiments, the display device is a multi-location multi-region display device. FIG. 17 depicts a multi-location multi-region display device 1700 that includes two sub-display devices 1701 and 1702. The sub-display device 1701 includes display regions 1721 and 1722. The sub-display device 1702 includes display regions 1723 and 1724. The sub-display device 1701 has a viewable sub-region 1711, and the sub-display device 1702 has a viewable sub-region 1712. The sub-display device 1701 is located in a first location, and the sub-display device 1702 is located in a different, second location.

In some embodiments, output of a first display system application of a first client device located in the first viewable sub-region 1711 is displayed at a display region (e.g., 1721, 1722) of the first sub-display device 1701, and output of a second display system application of a second client device located in the second viewable sub-region 1712 of the second sub-display device 1702 is displayed by a display region (e.g., 1723, 1724) of the second sub-display device 1702.

In some embodiments, the first sub-display device 1701 displays a first visual indicator 1731 and the second sub-display device 1702 displays a second visual indicator 1732. The first visual indicator 1731 indicates presence of the second client device within the second viewable sub-region 1712. The second visual indicator 1732 indicates presence of the first client device within the first viewable sub-region 1711.

Second Client

In some embodiments, the method 1600 includes: accessing second program instructions of a second client application (e.g., T3D of FIG. 6) of a second client device (e.g., 152 of FIG. 6) that is located within the first viewable region; generating display output (e.g., 601 of FIG. 6) of a second display system application (e.g., T3M of FIG. 6, 1195 of FIG. 11) by executing the accessed second program instructions; determining a first absolute position of the second client device; determining a display area for the display output (e.g., 601 of FIG. 6) of the second display system application; determining a second pixel region of the display device that corresponds to the determined display area for the second display system application and the first absolute position of the second client device; and displaying the display output of the second display system application by using the determined second pixel region for the second display system application. In some embodiments, the computing system 198 uses the tracking system 110 to spatially track absolute position of the second client device (e.g., 152) in real time.

Coupling Applications

In some embodiments, the computing system uses the tracking system to spatially track absolute position of the first client device (e.g., 151) and the second client device (e.g., 152) in real time. In some embodiments, the computing system communicatively couples the first display system application (e.g., T2M of FIG. 7, 1194 of FIG. 11) with the second display system application (e.g., T3M of FIG. 7, 1195 of FIG. 11) based on proximity of the first client device (e.g., 151) to the second client device (e.g., 152) as determined by the tracking of the first client device and the second client device. In some embodiments, the computing system controls the display device to display a visual indicator (e.g., visual indicator 701 of FIG. 7) that indicates that the first display system application and the second display system application are communicatively coupled.

Figure 8:
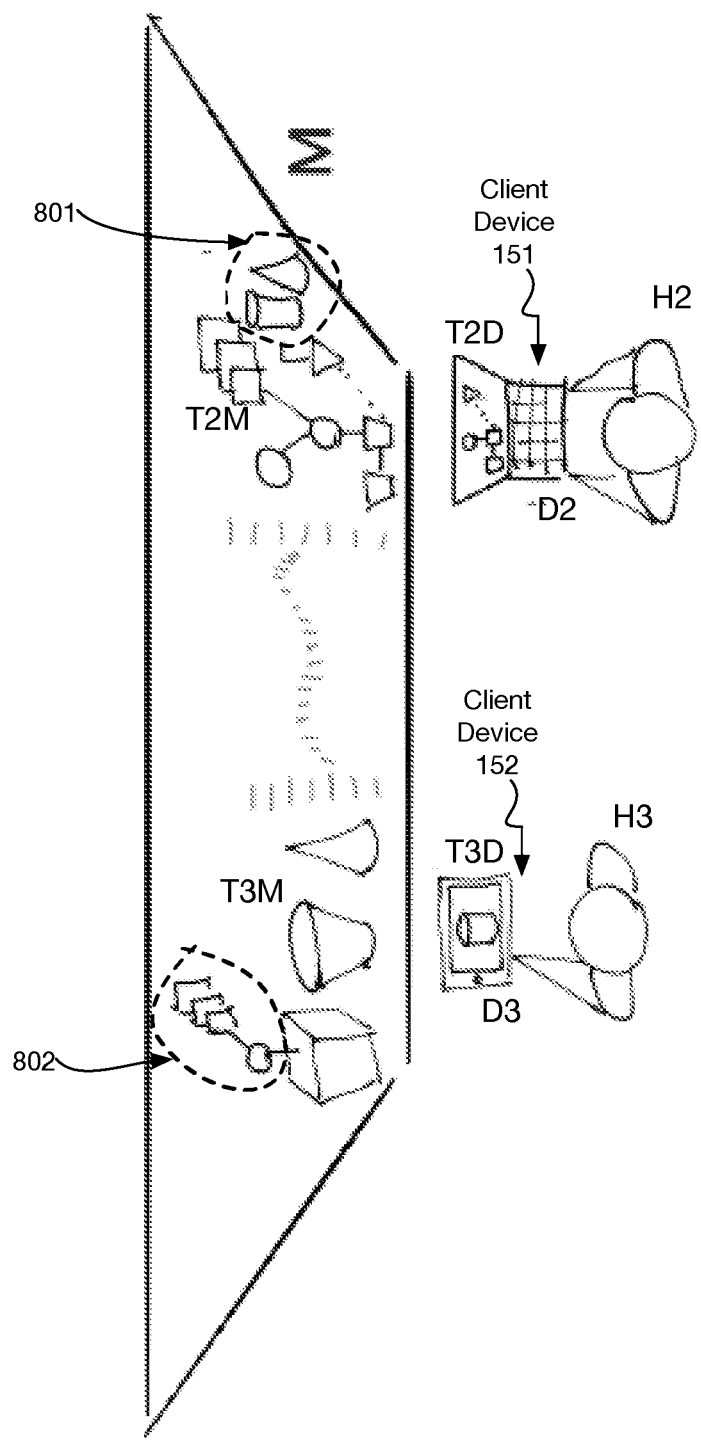

In some embodiments, the computing system transfers data from the first display system application to the communicatively coupled second display system application. As shown in FIG. 8, display output 802 represents data transferred from the display system application for the client device 151, and display output 801 represents data transferred from the display system application for the client device 152.

In some embodiments, the first display system application is a spatial application. In some embodiments, the first display system application is an application of a first spatial application display session of the first client device. In some embodiments, the second display system application is a spatial application. In some embodiments, the second display system application is an application of a second spatial application display session of the second client device. In some embodiments, the computing system establishes the first spatial application display session with the first client application of the first client device. In some embodiments, the computing system establishes the second spatial application display session with the second client application of the second client device. In some embodiments, the computing system communicatively couples the first display system application with the second display system application by merging the second spatial application display session with the first spatial application display session.

Communication Between Display System Computing System and Client Device

In some embodiments, the computing system 198 is communicatively coupled to the first client device (e.g., 151) via a spatial application network.

In some embodiments, the computing system 198 is constructed to communicate with the first client device (e.g., 151) by using a spatial application communication protocol.

In some embodiments, the computing system 198 is constructed to communicate with the first client device (e.g., 151) by using a g-speak communication protocol.

In some embodiments, the computing system 198 is constructed to communicate with the first client device (e.g., 151) by using an application-independent communication protocol for communication between an application of the computing system 198 and a plurality of types of client applications (e.g., 1294 of FIG. 12).

Accessing Program Instructions

In some embodiments, accessing the first program instructions includes retrieving the first program instructions from a storage device communicatively coupled to the computing system 198. In some embodiments, accessing the first program instructions includes receiving the first program instructions from the first client device. In some embodiments, accessing the first program instructions includes requesting the first program instructions from the first client device.

Augmented Functionality

In some embodiments, the first display system application includes functionality that is augmented with respect to functionality of the first client application. In some embodiments, the computing system 198 augments functionality of the first display system application with respect to functionality of the first client application at the first client device.

7. SYSTEM ARCHITECTURE

FIG. 11

FIG. 11 is an architecture diagram of a display system computing device 1100 in accordance with embodiments. In some embodiments, the display system computing device is similar to the display system computing devices 102 and 103 of FIG. 1. In some embodiments, the display system computing device 1100 includes a display device (e.g., 1191). In some embodiments, the display system computing device 1100 includes a user input device (e.g., 1192). In some embodiments, the display system computing device 1100 is communicatively coupled to the multi-region display device (e.g., 101 of FIG. 1, M of FIGS. 3-10). In some embodiments, the display system computing device 1100 is communicatively coupled to the tracking system 110. In some embodiments, the display system computing device 1100 is communicatively coupled to at least one tracking wand (e.g., 113, 114 of FIG. 1, W of FIGS. 3-10). In some embodiments, the display system computing device 1100 is communicatively coupled to at least one spatial pointing device that provides the display system computing device 1100 with 3-dimensional (X-Y-Z) user inputted positional coordinates. In some embodiments, the display system computing device 1100 includes a spatial application display system communication module 1193. In some embodiments, the spatial application display system communication module 1193 is constructed to provide g-speak functionality as described in US-2015-0077326, the contents of which is incorporated in its entirety by this reference. In some embodiments, the display system computing device 1100 includes a first spatial display system application 1194. In some embodiments, the display system computing device 1100 includes plural spatial display system applications 1194 and 1195. In some embodiments, the spatial display system application 1194 (e.g., $T\_i\_j(m)$, $T\_k\_l(m)$, $T\_2m$, $T\_3m$) is a g-speak application as described in US-2015-0077326, the contents of which is incorporated in its entirety by this reference.

In some embodiments, the display system computing device 1100 is implemented as a single hardware server device. In some embodiments, display system computing device 1100 is implemented as a plurality of hardware devices similar to the hardware server device 1100 of FIG. 11.

In some embodiments, the display system computing device 1100 includes a bus 1101 that interfaces with the processors 1101A-1101N, the main memory (e.g., a random access memory (RAM)) 1122, a read only memory (ROM) 1104, a processor-readable storage medium 1105, and a network device 1111. In some embodiments, the display system computing device 1100 includes at least one of a display device (e.g., 1191) and a user input device (e.g., 1192). In some embodiments, the device 1100 includes one processor (e.g., 1101A).

The processors 1101A-1101N may take many forms, such as one or more of a microcontroller, a CPU (Central Processing Unit), a GPU (Graphics Processing Unit), and the like. In some embodiments, the device 1100 includes at least one of a central processing unit (processor), a GPU, and a multi-processor unit (MPU).

The processors 1101A-1101N and the main memory 1122 form a processing unit 1199. In some embodiments, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip).

The network adapter device 1111 provides one or more wired or wireless interfaces for exchanging data and commands between the device 1100 and other devices, such as the multi-region display device lot, another display system computing device, a tracking system (e.g., 110 of FIG. 1), a tracking system processing device (e.g., 112 of FIG. 1), and a client device (e.g., 151, 152 of FIG. 1, 1200 of FIG. 12). Such wired and wireless interfaces include, for example, a universal serial bus (USB) interface, Bluetooth interface, Wi-Fi interface, Ethernet interface, InfiniBand interface, Fibre Channel interface, near field communication (NFC) interface, and the like.

Machine-executable instructions in software programs (such as an operating system, application programs, and device drivers) are loaded into the memory 1122 (of the processing unit 1199) from the processor-readable storage medium 1105, the ROM 1104 or any other storage location. During execution of these software programs, the respective machine-executable instructions are accessed by at least one of processors 1101A-1101N (of the processing unit 1199) via the bus 1101, and then executed by at least one of processors 1101A-1101N. Data used by the software programs are also stored in the memory 1122, and such data is accessed by at least one of processors 1101A-1101N during execution of the machine-executable instructions of the software programs. The processor-readable storage medium 1105 is one of (or a combination of two or more of) a hard drive, a flash drive, a DVD, a CD, an optical disk, a floppy disk, a flash storage, a solid state drive, a ROM, an EEPROM, an electronic circuit, a semiconductor memory device, and the like.

The processor-readable storage medium 1105 includes machine-executable instructions (and related data) for an operating system 1112, software programs 1113, and device drivers 1114. In some embodiments, the machine-executable instructions of the storage medium 1105 include instructions of a spatial application display system communication module 1193 as described herein. In some embodiments, the machine-executable instructions of the storage medium 1105 do not include instructions of a spatial application display system communication module. In some embodiments, the machine-executable instructions of the storage medium 1105 include instructions of a single display system application 1194. In some embodiments, the machine-executable instructions of the storage medium 1105 include instructions of a plurality of display system applications (e.g., 1194 and 1195).

FIG. 12

FIG. 12 is an architecture diagram of a client device 1200 in accordance with embodiments. In some embodiments, the client device is similar to the client devices 151 and 152 of FIG. 1.

In some embodiments, the client device 1200 includes a spatial application display system communication module (e.g., 1293), is communicatively coupled to the multi-region display device (e.g., 101), and functions as a display system computing device (e.g., 102, 103). In some embodiments, the spatial application client communication module 1293 provides g-speak functionality as described in US-2015-0077326, the contents of which is incorporated in its entirety by this reference. In some embodiments, the spatial client application 1294 (e.g., T_i_j(d), T_k_l(d), T_2d, T_3d) is a g-speak application as described in US-2015-0077326, the contents of which is incorporated in its entirety by this reference.

In some embodiments, the client device 1200 includes a bus 1201 that interfaces with the processors 1201A-1201N, the main memory (e.g., a random access memory (RAM)) 1222, a read only memory (ROM) 1204, a processor-readable storage medium 1205, and a network device 1211. In some embodiments, the client device 1200 includes at least one of a display device (e.g., 1291) and a user input device (e.g., 1292). In some embodiments, the client device 1200 includes one processor (e.g., 1201A).

The processors 1201A-1201N may take many forms, such as one or more of a microcontroller, a CPU (Central Processing Unit), a GPU (Graphics Processing Unit), and the like. In some embodiments, the client device 1200 includes at least one of a central processing unit (processor), a GPU, and a multi-processor unit (MPU).

The processors 1201A-1201N and the main memory 1222 form a processing unit 1299. In some embodiments, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip).

The network adapter device 1211 provides one or more wired or wireless interfaces for exchanging data and commands between the system 1000 and other devices, such as an operator device. Such wired and wireless interfaces include, for example, a universal serial bus (USB) interface, Bluetooth interface, Wi-Fi interface, Ethernet interface, InfiniBand interface, Fibre Channel interface, near field communication (NFC) interface, and the like.

Machine-executable instructions in software programs (such as an operating system, application programs, and device drivers) are loaded into the memory 1222 (of the processing unit 1299) from the processor-readable storage medium 1205, the ROM 1204 or any other storage location. During execution of these software programs, the respective machine-executable instructions are accessed by at least one of processors 1201A-1201N (of the processing unit 1299) via the bus 1201, and then executed by at least one of processors 1201A-1201N. Data used by the software programs are also stored in the memory 1222, and such data is accessed by at least one of processors 1201A-1201N during execution of the machine-executable instructions of the software programs. The processor-readable storage medium 1205 is one of (or a combination of two or more of) a hard drive, a flash drive, a DVD, a CD, an optical disk, a floppy disk, a flash storage, a solid state drive, a ROM, an EEPROM, an electronic circuit, a semiconductor memory device, and the like.

The processor-readable storage medium 1205 includes machine-executable instructions (and related data) for an operating system 1212, software programs 1213, and device drivers 1214.

In some embodiments, the machine-executable instructions of the storage medium 1205 include instructions of a spatial application client communication module 1293 as described herein. In some embodiments, the machine-executable instructions of the storage medium 1205 do not include instructions of a spatial application client communication module. In some embodiments, the machine-executable instructions of the storage medium 1205 include instructions of a single client application 1294. In some embodiments, the machine-executable instructions of the storage medium 1205 include instructions of a plurality of client applications.

8. MACHINES

The systems and methods of the embodiments and variations thereof can be embodied and/or implemented at least in part as a machine configured to receive a computer-readable medium storing computer-readable instructions. The instructions are preferably executed by computer-executable components preferably integrated with the multi-region display system. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

9. CONCLUSION

As a person skilled in the art will recognize from the previous detailed description and from the figures and claims, modifications and changes can be made to the embodiments disclosed herein without departing from the scope defined in the claims.

What is claimed is:

1. A method comprising: at a display system computing system that is communicatively coupled to a display device:
    accessing first program instructions of a first client application of a first client device that is located within a first viewable region of the display device;
    generating display output of a first display system application by executing the accessed first program instructions;
    determining a first absolute three-dimensional (3D) position of the first client device in a three-dimensional coordinate space by using a 3D tracking system;
    determining a first pixel width and a first pixel height for the display output of the first display system application;
    determining a first pixel region, of the display device, that corresponds to the determined first pixel width and first pixel height and that corresponds to the first absolute 3D position of the first client device in the three-dimensional coordinate space; and
    displaying the display output of the first display system application by using the determined first pixel region,
    wherein the computing system uses the 3D tracking system to spatially track absolute 3D position of the first client device and a second client device in real time,
    wherein the computing system communicatively couples the first display system application with a second display system application, of the second client device, based on proximity of the first client device to the second client device as determined by the tracking of the first client device and the second client device, and
    wherein the computing system controls the display device to display a visual indicator that indicates that the first display system application and the second display system application are communicatively coupled.

2. The method of claim 1, further comprising:
    the computing system using the 3D tracking system to spatially track absolute 3D position of the first client device in real time;
    responsive to a change of position of the first client device from the first absolute 3D position to a second absolute 3D position, the computing system:
        determining a second pixel region of the display device that corresponds to the determined first pixel width and first pixel height and the second absolute 3D position of the first client device; and
        displaying the display output of the first display system application by using the determined second pixel region.

3. The method of claim 2, further comprising:
    the computing system using the tracking system to spatially track absolute 3D position and orientation of a first user input device in real time;
    the computing system generating user input information based on the spatial tracking of the 3D position and orientation of a first user input device in real time;
    the computing system determining whether the generated user input information corresponds to the display output of the first display system application; and
    responsive to a determination that the generated user input information corresponds to the display output of the first display system application, the computing system:
        updating the first display system application by using the user input information, and
        providing the user input information to the first client application.

4. The method of claim 3, further comprising: at the computing system:
    accessing second program instructions of a second client application of a second client device that is located within the first viewable region;
    generating display output of a second display system application by executing the accessed second program instructions;
    determining a first absolute 3D position of the second client device;
    determining a second pixel width and a second pixel height for the display output of the second display system application;
    determining a second pixel region of the display device that corresponds to the determined second pixel width and second pixel height for the second display system application and the first absolute 3D position of the second client device; and
    displaying the display output of the second display system application by using the determined second pixel region for the second display system application,
    wherein the computing system uses the tracking system to spatially track absolute 3D position of the second client device in real time.

5. The method of claim 1, further comprising: the computing system transferring data from the first display system application to the communicatively coupled second display system application.

6. The method of claim 3, wherein the first user input device is an input device of a user of the first client device.

7. The method of claim 3, wherein the first user input device is an input device of a user of a second client device.

8. The method of claim 1, further comprising: responsive to changed program data of the first client application, the computing system updating the first display system application by using the received changed program data of the first client application.

9. The method of claim 3,
wherein the display device is a multi-location multi-region display device,
wherein the first viewable region is a first viewable sub-region of a first sub-display device of the display device at a first location,
wherein the output of the first display system application is displayed at a display region of the first sub-display device;
wherein the output of a second display system application of a second client device located in a second viewable sub-region of a second sub-display device is displayed by a display region of the second sub-display device, and
wherein the second sub-display device is located at a second location.

10. The method of claim 9, wherein the first sub-display device displays a first visual indicator and the second sub-display device displays a second visual indicator, wherein the first visual indicator indicates presence of the second client device within the second viewable sub-region, and wherein the second visual indicator indicates presence of the first client device within the first viewable sub-region.

11. The method of claim 1, further comprising: the computing system determining that the first client device is located within the first viewable region based on information received from the first client device.

12. The method of claim 1, further comprising: the computing system determining that the first client device is located within the first viewable region based on information received from the tracking system that is communicatively coupled to the computing system.

13. The method of claim 1, further comprising: the computing system augmenting functionality of the first display system application with respect to functionality of the first client application at the first client device.

14. The method of claim 3,
wherein determining whether the generated user input information corresponds to the display output of the first display system application comprises:
determining a cursor position of the first user input device based on the user input information, wherein the cursor position is a position of a cursor displayed by the display device;
determining whether the cursor position is a position within display output of the first display system application; and
in a case where the cursor position is a position within display output of the first display system application, the computing system determining that the generated user input information corresponds to the display output of the first display system application.

15. The method of claim 1, wherein determining the first pixel region of the display device comprises:
determining at least a first pixel having an absolute 3D position that corresponds to the first absolute 3D position of the first client device; and
determining a pixel region that has the first pixel width and the first pixel height, and that has the first pixel as a center pixel of the pixel region,
wherein the display system computing system receives the first program instructions of the first client application from the first client device, and
wherein each absolute 3D position tracked by the tracking system is represented by X, Y and Z, coordinates within the three-dimensional coordinate space tracked by the 3D tracking system.

16. The method of claim 15,
wherein determining at least a first pixel having an absolute 3D position that corresponds to the first absolute 3D position of the first client device comprises: determining at least a first pixel having an absolute 3D position that is proximate to the first absolute 3D position of the first client device, and
wherein the computing system determines the absolute 3D position of the first pixel based on absolute 3D positions stored for each pixel of the display device.

17. The method of claim 15,
wherein determining at least a first pixel having an absolute 3D position that corresponds to the first absolute 3D position of the first client device comprises: determining at least a first pixel having an absolute 3D position that is proximate to the first absolute 3D position of the first client device, and
wherein the computing system computes the absolute 3D position of the first pixel based on stored absolute 3D position information for at least one pixel of the display device and information indicating relative position of the first pixel within the display device.

18. The method of claim 1,
wherein the tracking system is communicatively coupled to the computing system,
wherein the computing system includes at least one display system computing device,
wherein the absolute 3D position of each pixel of the display device is an absolute 3D position within the three-dimensional coordinate space,
wherein the display device is a multi-region display device and the first pixel region includes pixels of at least one display region of the multi-region display device, and
wherein the computing system determines the first pixel region by accessing stored absolute 3D position information for at least one pixel of the display device.

19. The method of claim 18,
wherein a multi-region display system includes the display system computing system, the tracking system, and the multi-region display device,
wherein the first display system application is a spatial application,
wherein the first display system application is an application of a first spatial application display session of the first client device,
wherein the second display system application is a spatial application,
wherein the second display system application is an application of a second spatial application display session of the second client device,
wherein the computing system establishes the first spatial application display session with the first client application of the first client device,
wherein the computing system establishes the second spatial application display session with the second client application of the second client device, and
wherein the computing system communicatively couples the first display system application with the second display system application by merging the second spatial application display session with the first spatial application display session.

\* \* \* \* \*